(12) United States Patent
Niu et al.

(10) Patent No.: US 12,710,532 B2
(45) Date of Patent: Aug. 18, 2026

(54) WAVEGUIDE ASSEMBLY, INTEGRATED CHIP AND LiDAR

(71) Applicant: SUTENG INNOVATION TECHNOLOGY CO., LTD., Shenzhen (CN)

(72) Inventors: Ben Niu, Shenzhen (CN); Jing Wang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 905 days.

(21) Appl. No.: 18/085,518

(22) Filed: Dec. 20, 2022

(65) Prior Publication Data

US 2023/0204768 A1 Jun. 29, 2023

(30) Foreign Application Priority Data

Dec. 24, 2021 (CN) ......................... 202111604390.X

(51) Int. Cl.
*G01S 17/02* (2020.01)
*G01S 7/481* (2006.01)
*G02B 6/12* (2006.01)

(52) U.S. Cl.
CPC ................ *G01S 17/02* (2013.01); *G02B 6/12* (2013.01); *G01S 7/4817* (2013.01); *G02B 2006/12147* (2013.01)

(58) Field of Classification Search
None
See application file for complete search history.

(56) References Cited

U.S. PATENT DOCUMENTS

2020/0183196 A1* 6/2020 Shim ..................... H01S 5/0201
2020/0284883 A1* 9/2020 Ferreira ................ G01S 7/4815
2020/0393616 A1* 12/2020 Schmid .................... G02B 6/34
2021/0018599 A1 1/2021 Lu et al.

FOREIGN PATENT DOCUMENTS

CN 106908776 A 6/2017
CN 112180506 A 1/2021
CN 112764287 A 5/2021
CN 113795773 A 12/2021

OTHER PUBLICATIONS

European Search Report issued in related European Application No. 22216426.1, mailed Apr. 28, 2023, 10 pages.
First Office Action of the Chinese application No. 202111604390.X, issued on Aug. 26, 2025.
Second Office Action of the Chinese application No. 202111604390.X, issued on Nov. 12, 2025.

* cited by examiner

*Primary Examiner* — Luke D Ratcliffe
(74) *Attorney, Agent, or Firm* — BAYES PLLC

(57) ABSTRACT

A waveguide assembly, an integrated chip, and a LiDAR are provided. The waveguide assembly includes a plurality of single-mode waveguides arranged with intervals. The effective refractive index of at least one single-mode waveguide is not equal to that of another adjacent single-mode waveguide.

9 Claims, 21 Drawing Sheets

WAVEGUIDE ASSEMBLY, INTEGRATED CHIP AND LiDAR

CROSS-REFERENCE TO RELATED APPLICATION

The present application claims the benefit of priority to China Patent Application No. CN202111604390.X, filed on Dec. 24, 2021, the content of which is incorporated herein by reference in its entirety.

TECHNICAL FIELD

The present application relates to the technical field of laser detection, and in particular to a waveguide assembly, an integrated chip, and a LiDAR.

BACKGROUND

A waveguide is a guided structure made of an optically-transparent medium (e.g., quartz glass) that transmits electromagnetic waves at optical frequencies. The transmission principle of the waveguide is that on a medium interface with different refractive indexes, the total internal reflection of electromagnetic waves limits optical waves to propagate in the waveguide and a limited area around the waveguide. Waveguides are widely used because of their low transmission loss characteristics.

For example, a waveguide is commonly used in LiDAR to achieve the reception of an echo laser signal. However, in a LiDAR with a rotatable reflector, if the reflector rotates before receiving an echo laser signal, the echo laser signal may be offset after passing through the rotated reflector, and the offset echo laser signal cannot be emitted to the waveguide through the reflector, so that the receiving rate of the echo laser signal is low.

SUMMARY

The present application provides a waveguide assembly, an integrated chip, and a LiDAR, which are used for solving the problem that the receiving rate of echo laser signals is low because the offset echo laser signals cannot be received by a waveguide in the related art.

In a first aspect, the present application provides an integrated chip, which includes a substrate and a waveguide assembly arranged on the substrate, wherein the waveguide assembly is configured for receiving an echo laser signal in a LiDAR, and the waveguide assembly includes:

a plurality of single-mode waveguides, wherein each single-mode waveguide extends along a first direction and the plurality of single-mode waveguides are arranged with intervals along a second direction, the second direction intersects with the first direction, and in the plurality of single-mode waveguides, an effective refractive index of at least one single-mode waveguide is not equal to an effective refractive index of another adjacent single-mode waveguide.

In a second aspect, the present application provides a LiDAR, which includes an optical scanning device, configured for changing a direction of the echo laser signal and enabling the echo laser signal to be emitted to the waveguide assembly, which further includes the integrated chip described above, wherein the waveguide assembly of the integrated chip is configured for receiving an echo laser signal reflected by a detected target.

In a third aspect, the present application provides an integrated chip, which includes a substrate and a waveguide assembly arranged on the substrate, wherein the waveguide assembly is configured for receiving an echo laser signal in a LiDAR, and the waveguide assembly includes:

a plurality of single-mode waveguides, wherein each single-mode waveguide extends along a first direction and the plurality of single-mode waveguides are arranged with intervals along a second direction, the second direction intersects with the first direction, and in the plurality of single-mode waveguides, an isolation structure is arranged between at least one single-mode waveguide and another adjacent single-mode waveguide.

In a fourth aspect, the present application provides a LiDAR, which includes an optical scanning device, configured for changing a direction of the echo laser signal and enabling the echo laser signal to be emitted to the waveguide assembly, which further includes the integrated chip described above, wherein the waveguide assembly of the integrated chip is configured for receiving the echo laser signal reflected by a detected target.

According to the waveguide assembly, the integrated chip, and the LiDAR of the present application, the waveguide assembly is designed to include a plurality of single-mode waveguides arranged with intervals, when echo laser signals are offset due to the presence of a walk-off effect, the offset echo laser signals can reach other single-mode waveguides, and therefore avoiding the problem in the related art that the offset echo laser signals cannot be received due to the fact that only a single-mode waveguide is included. Compared with the prior art in which a multi-mode waveguide is directly arranged and offset echo laser signals are received by means of the large width of the multi-mode waveguide, by adopting a plurality of single-mode waveguides in the present application, the problem that the high-order mode of the multi-mode waveguide is triggered when the echo laser signals are received does not exist, namely, there is no loss of lasers of the high-order mode, therefore achieving the advantage of higher receiving rate of echo laser signals. In addition, in one solution, the effective refractive index of at least one single-mode waveguide is designed to be different from another adjacent single-mode waveguide, so that the phase matching condition between two adjacent single-mode waveguides may be broken, thus inhibiting the coupling between two adjacent single-mode waveguides and reducing the crosstalk. In this way, under the same coupling capacity demand, the spacing between two adjacent single-mode waveguides with different effective refractive indexes may be smaller, and offset echo laser signals are less likely to fall onto a blank area between two adjacent single-mode waveguides. Therefore, more offset echo laser signals can fall onto the single-mode waveguides and be coupled with the single-mode waveguides, thereby improving the receiving rate of echo laser signals. In another solution, the coupling between two adjacent single-mode waveguides may be weakened through an isolation structure arranged between two adjacent single-mode waveguides, thus reducing the crosstalk between the two single-mode waveguides. In this way, under the same coupling capacity demand, the spacing between two adjacent single-mode waveguides provided with the isolation structure may be smaller, and the offset echo laser signals are less likely to fall onto a blank area between two adjacent single-mode waveguides, thus improving the receiving rate of echo laser signals. If a same number of single-mode waveguides are used, the smaller the spacing between two adjacent single-mode waveguides is, the smaller the size of the waveguide assembly may be, which is beneficial to decreasing chip area, improving integration level, and reducing cost. If the size of the waveguide assembly is unchanged, a larger number of single-mode waveguides may be accommodated, and the duty ratio between the single-mode waveguides is remarkably reduced.

BRIEF DESCRIPTION OF DRAWINGS

In order to more clearly illustrate embodiments of the present application or the technical solutions in related art, the drawings are briefly described below. The drawings are only some embodiments of the present application, and other drawings can be derived from these drawings by those of ordinary skill in the art without making creative efforts.

DETAILED DESCRIPTION

In order to make the purposes, technical solutions, and advantages of the present application clearer, the embodiments of the present application are described in detail with reference to the accompanying drawings.

When accompanying drawings are involved in the description below, the same numbers in different drawings represent the same or similar elements, unless otherwise indicated. The modes of implementation described in the following exemplary embodiments do not represent all modes of implementation consistent with the present application. Rather, they are merely examples of devices and methods consistent with certain aspects of the present application detailed in the appended claims.

Figure 1:
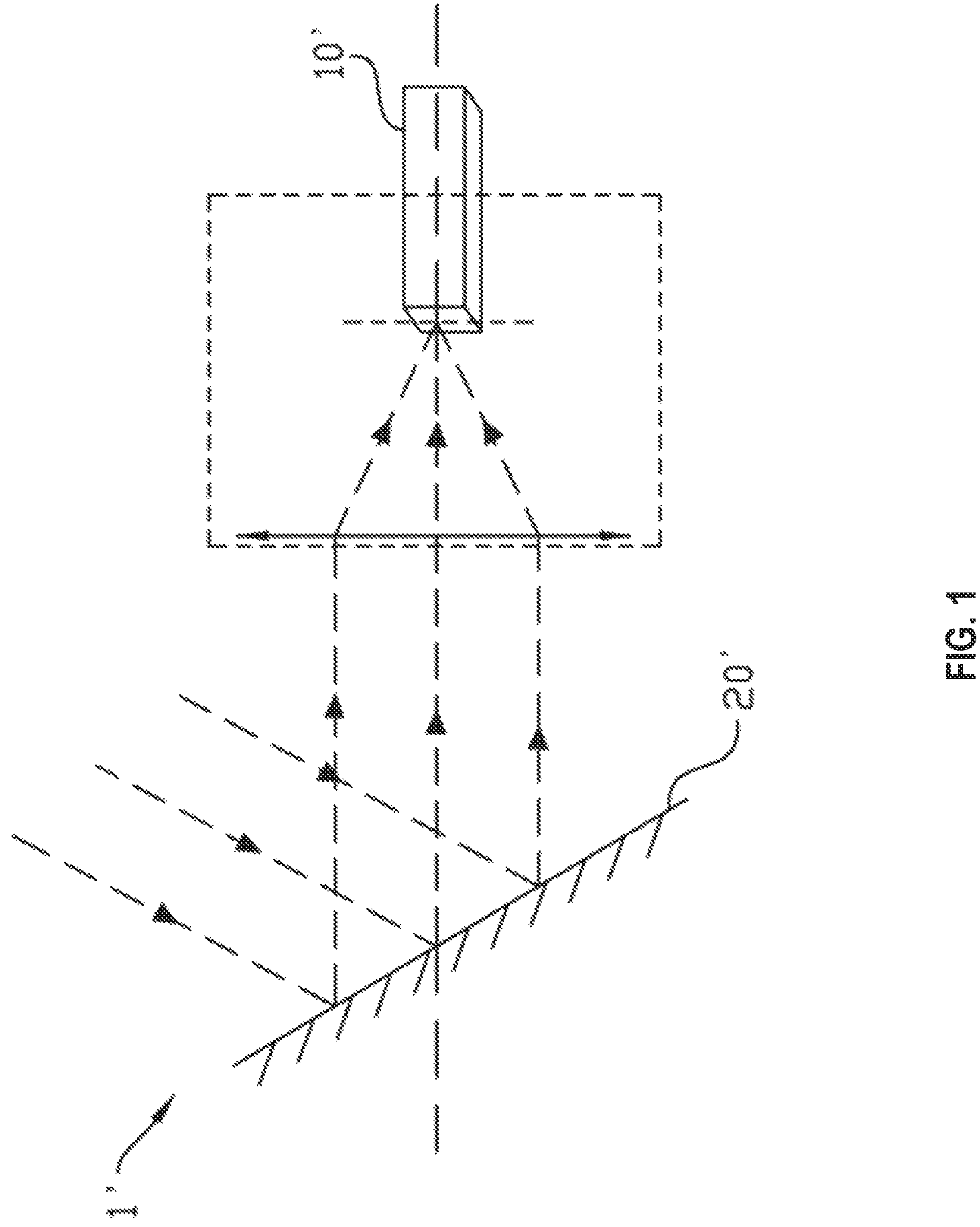
FIG. 1 is a schematic diagram of an optical path of an echo laser signal of a LiDAR in a state in the related art.
Figure 2:
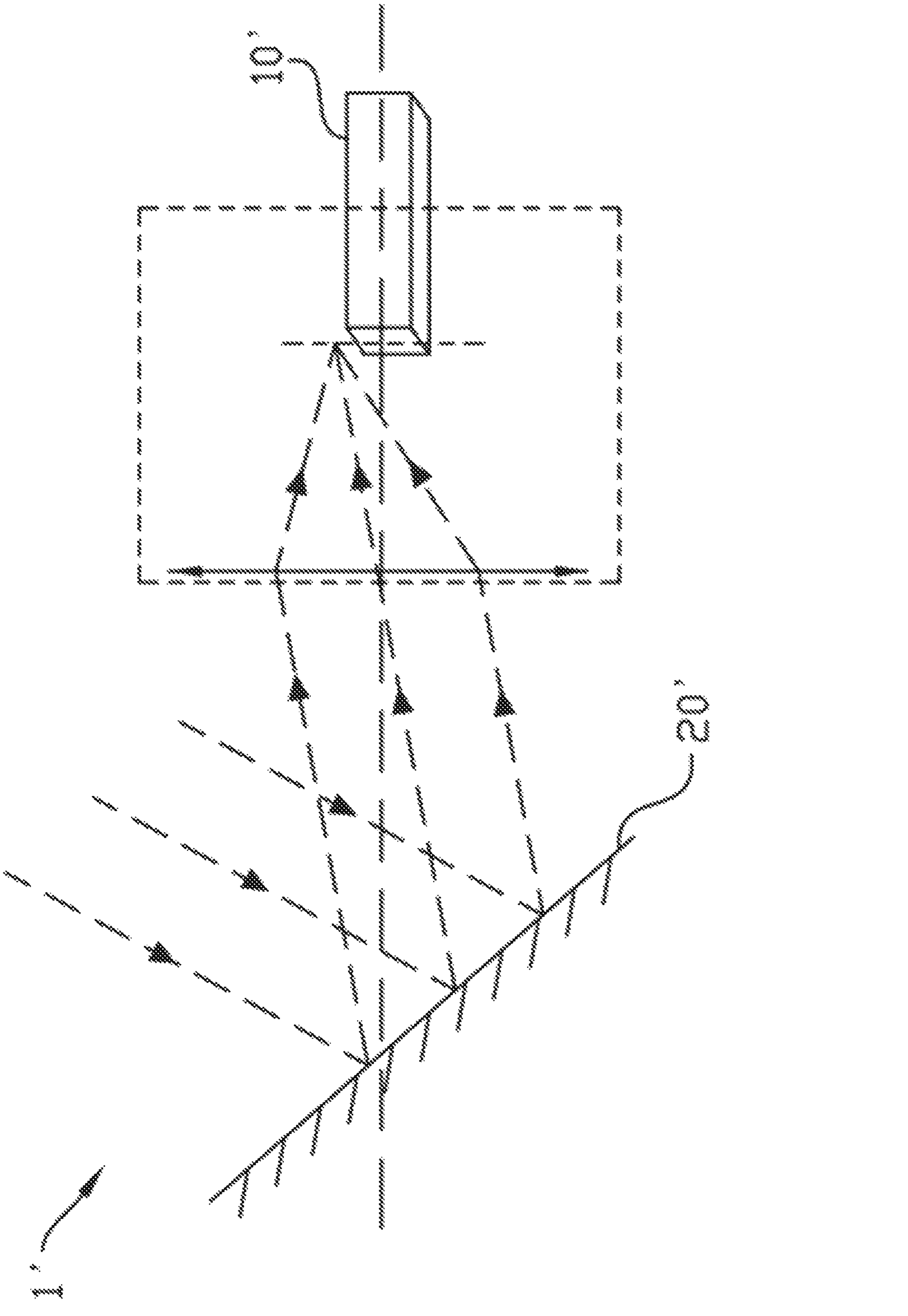
FIG. 2 is a schematic diagram of an optical path of an echo laser signal of the LiDAR shown in FIG. 1 in another state.
Figure 3:
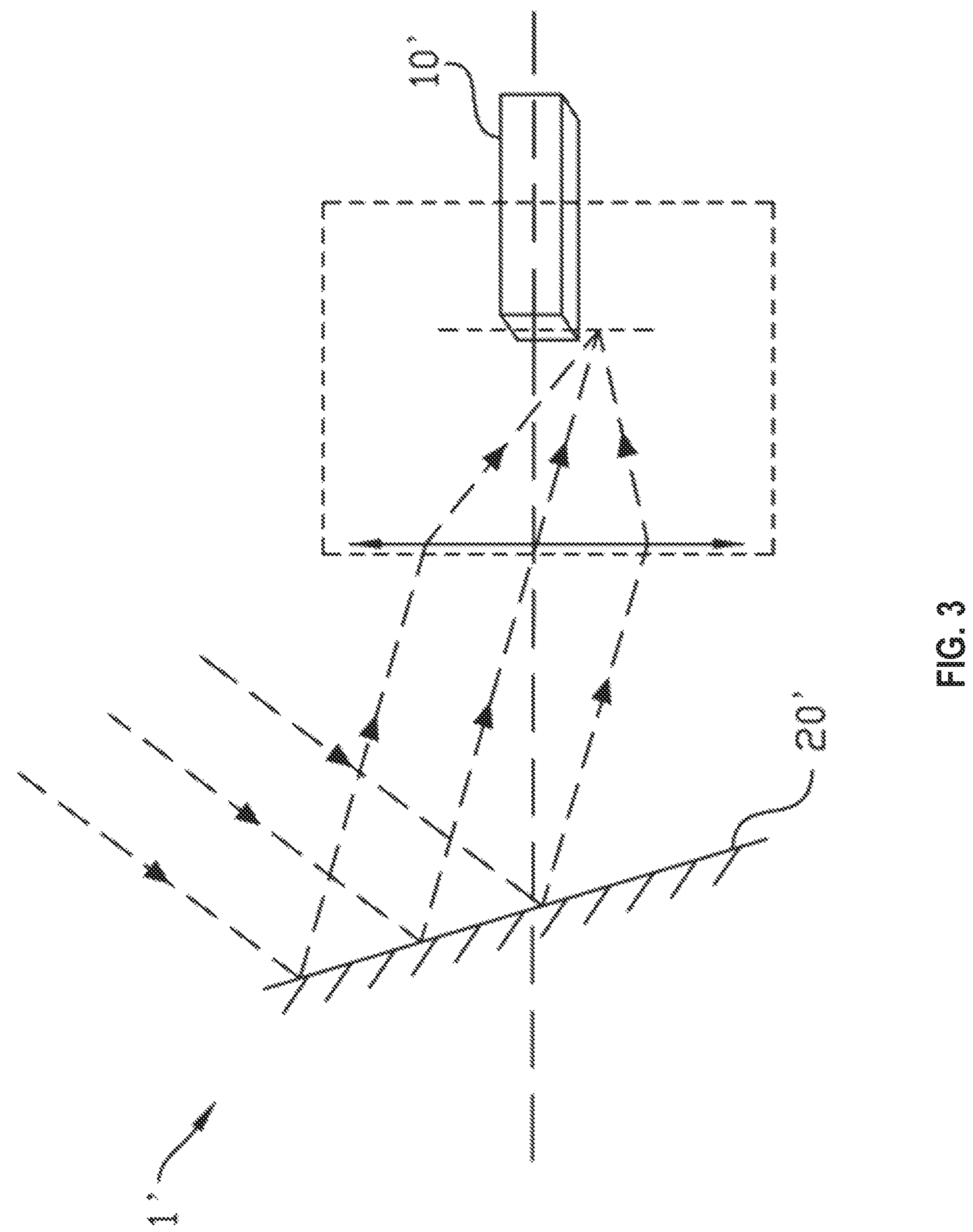
FIG. 3 is a schematic diagram of an optical path of an echo laser signal of the LiDAR shown in FIG. 1 in yet another state.
Figure 4:
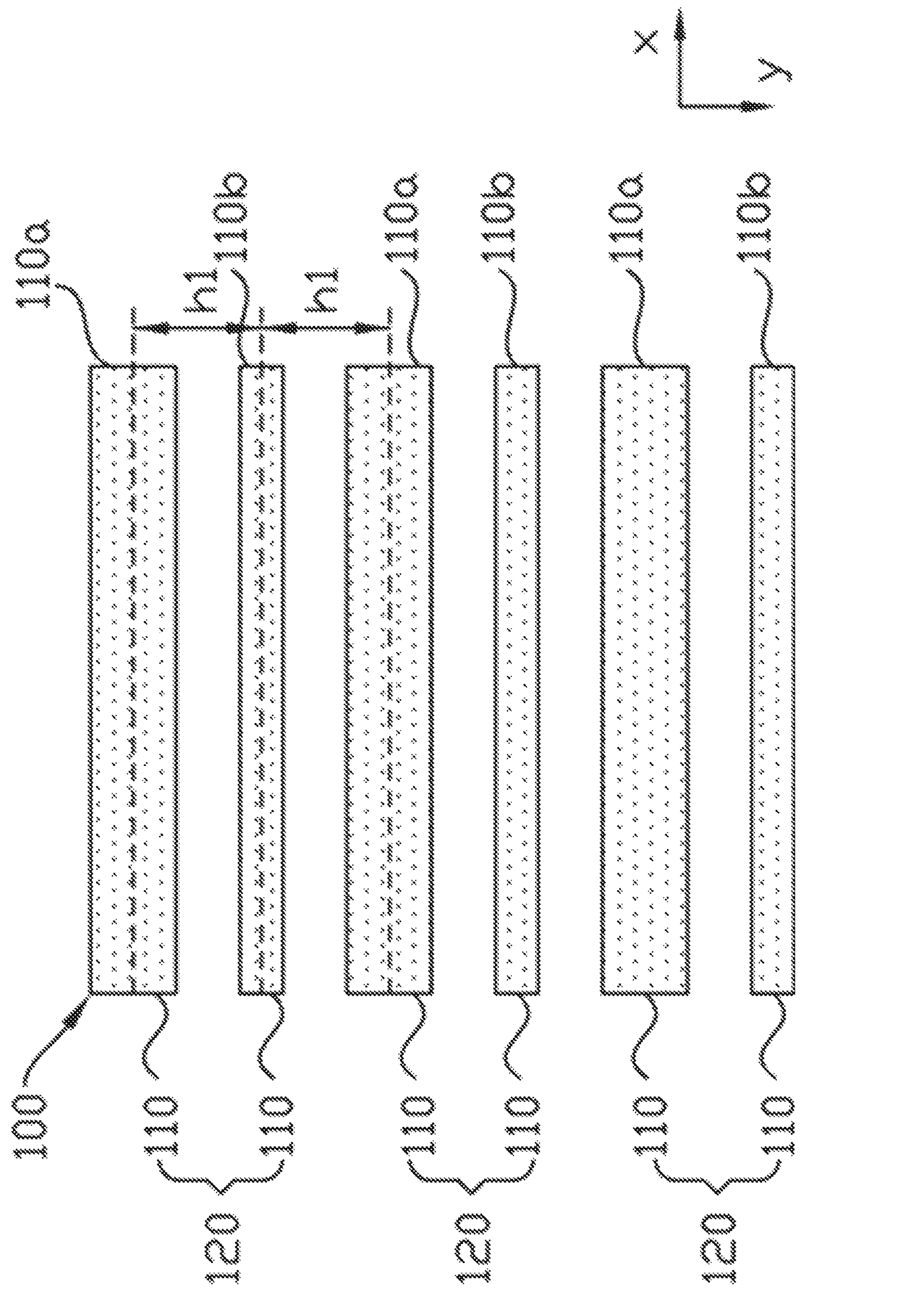
FIG. 4 is a schematic structural diagram of a first waveguide assembly provided in an embodiment of the present application.

In the related art, referring to FIG. 1, a LiDAR 1' includes a single-mode waveguide 10' for receiving echo laser signals and a reflector 20' for deflecting the echo laser signals transmitted to the single-mode waveguide 10'. When the reflector 20' is static, the echo laser signals of the LiDAR 1' may directly reach the single-mode waveguide 10'. When the reflector 20' moves, for example, referring to FIG. 2 and FIG. 3, when the reflector 20' rotates, the echo laser signals emitted from the reflector 20' are offset, such that the echo laser signals emitted from the reflector 20' cannot return to the corresponding single-mode waveguide 10', which means that a walk-off effect occurs, and thus the receiving rate of the echo laser signals is reduced. The farther the detected target is, the larger the movement angular velocity of the reflector 20' is, the more critical the walk-off effect is, and the lower the receiving rate of the echo laser signals is. Based on this, an embodiment of the present application provides a waveguide assembly 100. Referring to FIG. 4, the waveguide assembly 100 includes a plurality of single-mode waveguides 110 arranged with intervals. In the embodiment of the present application, the waveguide assembly 100 is designed to include the plurality of single-mode waveguides 110 arranged with intervals, and when echo laser signals are offset due to the presence of a walk-off effect, the offset echo laser signals may reach other single-mode waveguides 110, therefore avoiding the problem in the related art that the offset echo laser signals cannot be received due to the fact that only a single-mode waveguide 110 is included.

Meanwhile, compared with directly arranging a multi-mode waveguide and receiving offset echo laser signals with the help of the large width of the multi-mode waveguide in the related art, the embodiment of the present application adopts a plurality of single-mode waveguides 110 to receive echo laser signals, there is no problem of triggering the high-order mode of the multi-mode waveguide when receiving the echo laser signals. When the multi-mode waveguide is converted into the single-mode waveguide 110, the lasers of the high-order mode will be lost, so that the remaining echo laser signals in the multi-mode waveguide manner is much less than the received echo laser signals, and the wider the multi-mode waveguide is, the larger the conversion loss from the multi-mode waveguide to the single-mode waveguide 110 is. That is, compared with the related art in which offset echo laser signals are received by a multi-mode waveguide, the embodiment of the present application has an advantage of a higher receiving rate of echo laser signals as there is no lost of lasers of a high-order mode.

The waveguide assembly 100 may be used in the LiDAR 1 to receive the echo laser signals, so that when the waveguide assembly 100 receives the echo laser signals, the plurality of single-mode waveguides 110 may enlarge a receiving field of view of the LiDAR 1 to make the angle of the LiDAR 1 wider.

In a plurality of single-mode waveguides 110, each single-mode waveguide 110 may extend substantially along a first direction x, and the plurality of single-mode waveguides 110 may be arranged with intervals substantially along a second direction y that intersects with the first direction x, wherein an included angle between the second direction y and the first direction x may be any value greater than 0° and less than 90°. In some embodiments, the second direction y may be perpendicular to the first direction x, such that the structural design of the waveguide assembly 100 is more compact, which is beneficial to realizing a miniaturized design of the waveguide assembly 100.

In some embodiments, in a plurality of single-mode waveguides 110, an effective refractive index of at least one single-mode waveguide 110 may be not equal to an effective refractive index of another adjacent single-mode waveguide 110. In the case where a center-to-center spacing of a same single-mode waveguide 110 and another adjacent single-mode waveguide 110 is equal, if the effective refractive index of the other single-mode waveguide 110 is not equal to the effective refractive index of the single-mode waveguide, the crosstalk between the two single-mode waveguides 110 is lower compared with the case where the effective refractive index of the other single-mode waveguide 110 is equal to the effective refractive index thereof. The effective refractive indexes of the two adjacent single-mode waveguides 110 are not equal to each other, so that the phase matching condition between the two adjacent single-mode waveguides 110 may be broken, thus inhibiting the coupling between the two adjacent single-mode waveguides 110 and reducing the crosstalk. In this way, under the same coupling capability demand, the spacing between two adjacent single-mode waveguides 110 with effective refractive indexes not equal to each other may be smaller than the spacing between two adjacent single-mode waveguides 110 with effective refractive indexes equal to each other. With smaller spacing between two adjacent single-mode waveguides 110, the offset echo laser signals are less likely to fall onto a blank area between two adjacent single-mode waveguides 110. Therefore, more offset echo laser signals can fall onto the single-mode waveguides 110 and be coupled with the single-mode waveguides 110, thereby improving the receiving rate of echo laser signals. If a same number of single-mode waveguides 110 are used, the smaller the spacing between two adjacent single-mode waveguides 110 is, the smaller the size of the waveguide assembly 100 may be, which is beneficial to decreasing chip area, improving integration level, and reducing cost. If the size of the waveguide assembly 100 is unchanged, a larger number of single-mode waveguides 110 may be accommodated, and the duty ratio between the single-mode waveguides 110 is remarkably reduced.

In some embodiments, in a plurality of single-mode waveguides 110, an effective refractive index of each single-mode waveguide 110 may be designed to be not equal to an effective refractive index of another adjacent single-mode waveguide 110. The spacing between adjacent two single-mode waveguides 110 in the waveguide assembly 100 may be designed to be smaller, the receiving rate of the echo laser signals by the waveguide assembly 100 may be optimized, and the minimized design of the LiDAR 1 may be realized.

In some embodiments, in two adjacent single-mode waveguides 110, a width of one single-mode waveguide 110 along the second direction y is not equal to a width of the other single-mode waveguide 110 along the second direction y. The widths of two adjacent single-mode waveguides 110 along the second direction y that are not equal to each other may make effective refractive indexes of the two adjacent single-mode waveguides 110 not equal to each other, so that the spacing between the two adjacent single-mode waveguides 110 is smaller, and the receiving rate of the echo laser signals is improved. Two adjacent single-mode waveguides 110 with widths along the second direction y not equal to each other may be manufactured by adjusting the growth process of the waveguides. The molding process is simple, and the production cost is low.

It should be noted that, the coupling capability is strong when two single-mode waveguides 110 with the widths along the second direction y equal to each other. When the waveguide assembly 100 includes the two single-mode waveguides 110 with the widths along the second direction y equal to each other, the coupling between the two single-mode waveguides 110 with the widths equal to each other may be inhibited by increasing the spacing between the two single-mode waveguides, thus reducing the crosstalk between the two single-mode waveguides. Since the increased spacing between the two single-mode waveguides may cause the offset echo laser signals to enter a relatively large blank area between the two single-mode waveguides without being coupled with the single-mode waveguide 110, further, when the spacing between two single-mode waveguides 110 with widths along the second direction y equal to each other is relatively large, the number of other single-mode waveguides 110 arranged between the two single-mode waveguides with widths not equal to one another may also be increased.

For example, for two single-mode waveguides 110 with the widths along the second direction y equal to each other, a single-mode waveguide 110 with a different width may be arranged therebetween; a plurality of single-mode waveguides 110 (e.g., two, three, four, five, etc.) with different widths may also be arranged therebetween. It can be understood that the larger the number of the single-mode waveguides 110 with different widths arranged between the two single-mode waveguides 110 with the widths along the second direction y equal to each other is, the smaller the blank area between the two single-mode waveguides is, and the higher the receiving rate of the echo laser signals is. In some embodiments, two single-mode waveguides 110 with different widths may be arranged between two single-mode waveguides 110 with widths along the second direction y equal to each other, so as to reduce the number of single-mode waveguides 110 between the two single-mode waveguides 110 with the widths equal to each other on the basis of reduction in the blank area therebetween, simplify the difficulty of designing the size of the single-mode waveguides 110 therebetween, and reduce the production and manufacturing cost.

In the plurality of single-mode waveguides 110 of the waveguide assembly 100, two or more adjacent single-mode waveguides 110 may be combined to form a waveguide unit 120, and the waveguide assembly 100 may include a plurality of waveguide units 120 arranged along the second direction y. The waveguide assembly 100 is designed to include a plurality of waveguide units 120, so that in an aspect, structural regularity of the waveguide assembly 100 may be guaranteed, and receiving capability of echo laser signals at each area of the waveguide assembly 100 is approximately balanced, and in another aspect, only one group of waveguide units 120 need to be designed and then reuse the design, and thus design difficulty of the waveguide assembly 100 may be reduced, and the production and manufacturing cost may be reduced.

It can be understood that two single-mode waveguides 110, three single-mode waveguides 110, four single-mode waveguides 110, or the like may be included in the waveguide unit 120, which is not limited in the embodiment of the present application. When three or more single-mode waveguides 110 are included in the waveguide unit 120, the widths of the three or more single-mode waveguides 110 in the waveguide unit 120 along the second direction y may sequentially increase, sequentially decrease, sequentially increase and then decrease, sequentially decrease and then increase, or the like, which is not limited in the embodiment of the present application.

For example, the waveguide assembly 100 may include a first single-mode waveguide 110*a*, a second single-mode waveguide 110*b*, a first single-mode waveguide 110*a*, a second single-mode waveguide 110*b*, a first single-mode waveguide 110*a*, a second single-mode waveguide 110*b*, and the like, which are sequentially arranged along the second direction y. At this time, the first single-mode waveguide 110*a* and the adjacent second single-mode waveguide 110*b* located therebehind may be considered as a waveguide unit 120 in combination. A width of the first single-mode waveguide 110*a* along the second direction y may be greater than or less than a width of the second single-mode waveguide 110*b* along the second direction y. Each waveguide unit 120 includes the same two kinds of single-mode waveguides 110, and the arrangement order of the two single-mode waveguides 110 in each waveguide unit 120 is the same.

Figure 5:
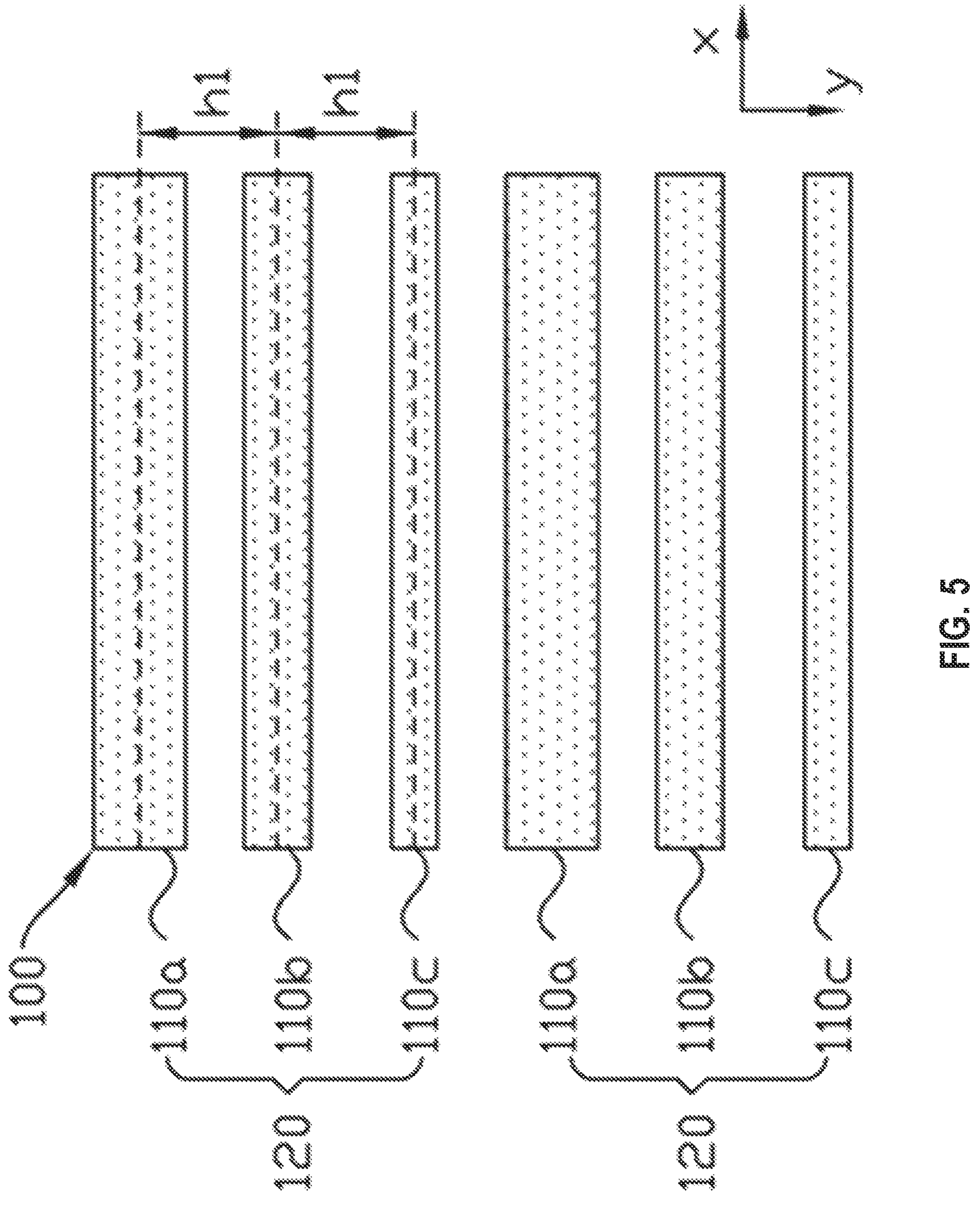
FIG. 5 is a schematic structural diagram of a second waveguide assembly provided in an embodiment of the present application.
Figure 6:
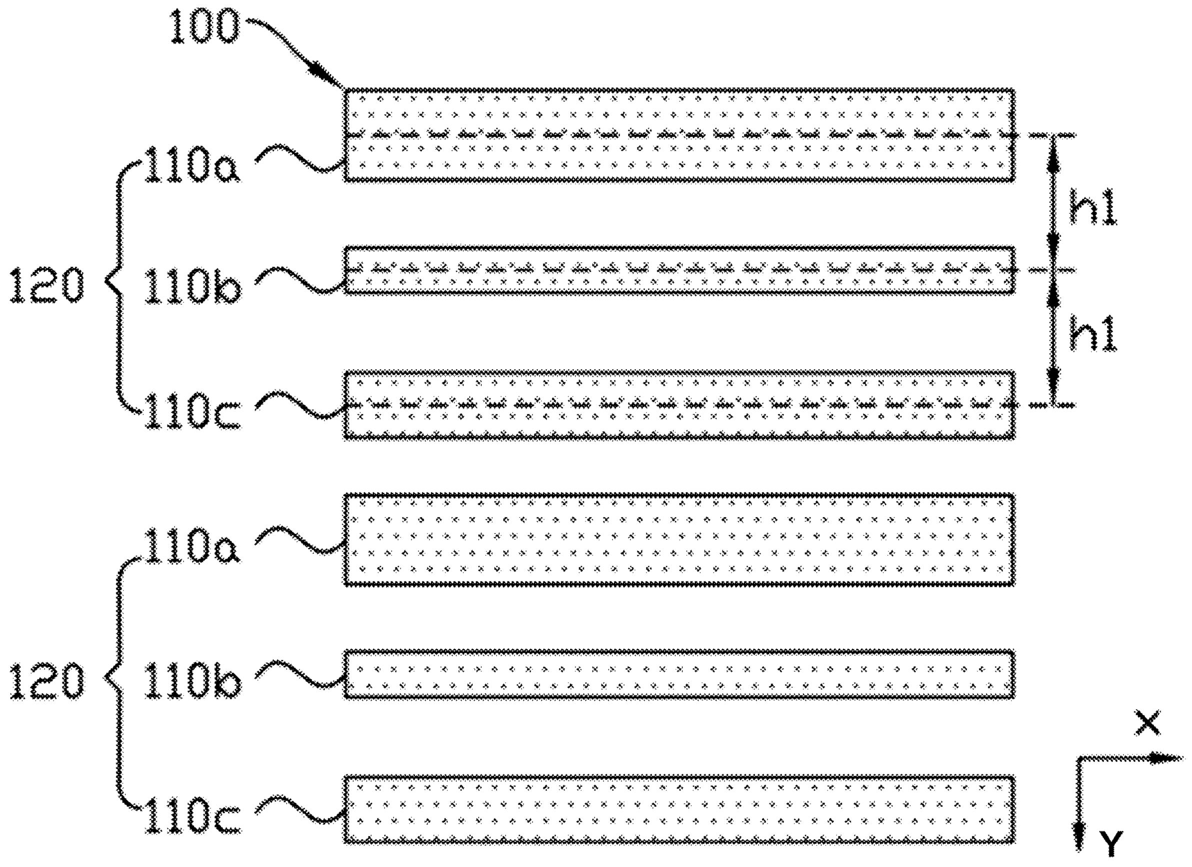
FIG. 6 is a schematic structural diagram of a third waveguide assembly provided in an embodiment of the present application.

For another example, referring to FIG. 5, the waveguide assembly 100 may include a first single-mode waveguide 110*a*, a second single-mode waveguide 110*b*, a third single-mode waveguide 110*c*, a first single-mode waveguide 110*a*, a second single-mode waveguide 110*b*, a third single-mode waveguide 110*c*, and the like, which are sequentially arranged along the second direction y. At this time, the first single-mode waveguide 110*a*, the second single-mode waveguide 110*b*, and the third single-mode waveguide 110*c* adjacent thereto and located therebehind may be considered as a waveguide unit 120. In some embodiments, the width of the first single-mode waveguide 110*a* along the second direction y may be greater than the width of the second single-mode waveguide 110*b* along the second direction y, and the width of the second single-mode waveguide 110*b* along the second direction y may be greater than the width of the third single-mode waveguide 110*c* along the second direction y. In some embodiments, referring to FIG. 6, the width of the first single-mode waveguide 110*a* along the second direction y may be greater than the width of the third single-mode waveguide 110*c* along the second direction y, and the width of the third single-mode waveguide 110*c* along the second direction y may be greater than the width of the second single-mode waveguide 110*b* along the second direction y. Each waveguide unit 120 includes the same three kinds of single-mode waveguides 110, and the arrangement order of the three single-mode waveguides 110 in each waveguide unit 120 is the same.

Figure 7:
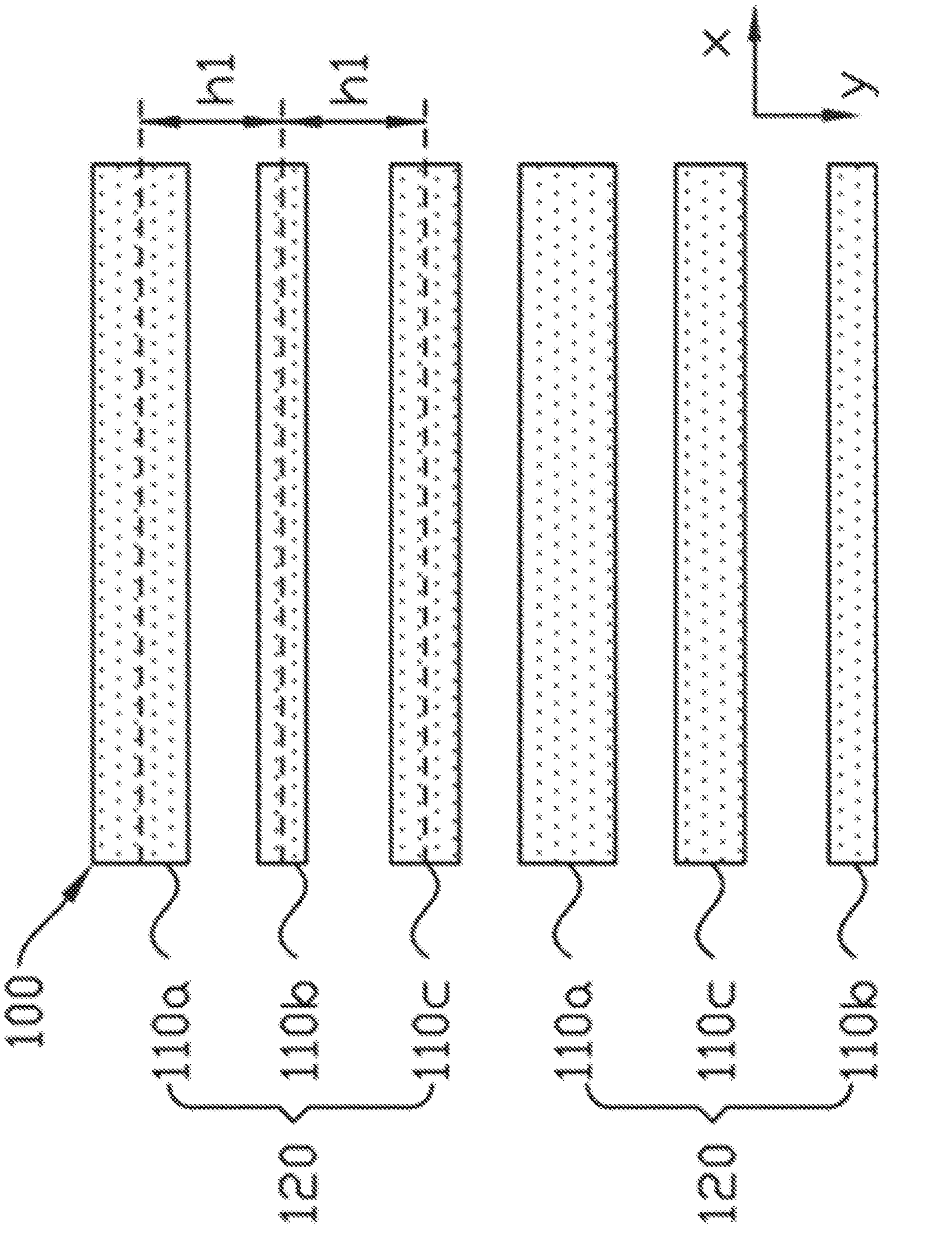
FIG. 7 is a schematic structural diagram of a fourth waveguide assembly provided in an embodiment of the present application.

For yet another example, referring to FIG. 7, the waveguide assembly 100 may include a first single-mode waveguide 110*a*, a second single-mode waveguide 110*b*, a third single-mode waveguide 110*c*, a first single-mode waveguide 110*a*, a third single-mode waveguide 110*c*, a second single-mode waveguide 110*b*, and the like, which are sequentially arranged along the second direction y. At this time, the first single-mode waveguide 110*a*, the second single-mode waveguide 110*b*, and the third single-mode waveguide 110*c* adjacent thereto and located therebehind are considered as a waveguide unit 120. The rear first single-mode waveguide 110*a*, the third single-mode waveguide 110*c*, and the second single-mode waveguide 110*b* adjacent thereto and located therebehind may be considered as another waveguide unit 120. In some embodiments, the width of the first single-mode waveguide 110*a* along the second direction y may be greater than the width of the third single-mode waveguide 110*c* along the second direction y, and the width of the third single-mode waveguide 110*c* along the second direction y may be greater than the width of the second single-mode waveguide 110*b* along the second direction y. Each waveguide unit 120 includes the same three kinds of single-mode waveguides 110, and the arrangement order of the three single-mode waveguides 110 in each waveguide unit 120 is different.

It should be noted that each waveguide unit 120 may include the same of a plurality of single-mode waveguides 110, and the arrangement order of the plurality of single-mode waveguides 110 in each waveguide unit 120 may be the same or different, which is not limited in the embodiment of the present application.

In some embodiments, referring to FIG. 4 to FIG. 7, when the widths of two adjacent single-mode waveguides 110 along the second direction y are not equal to each other, the lengths of two adjacent single-mode waveguides 110 along the first direction x may be equal to each other, and the center-to-center spacing h1 between each two adjacent single-mode waveguides 110 may be equal, so that the receiving performance of echo laser signals in the waveguide assembly 100 is better.

In addition to the above-mentioned inequality of the effective refractive indexes of the two adjacent single-mode waveguides 110 achieved by inequality of the widths of the two adjacent single-mode waveguides 110 along the second direction y, the inequality of the effective refractive indexes of the two adjacent single-mode waveguides 110 may also be achieved by inequality of duty ratios of the two adjacent single-mode waveguides 110. In some embodiments, referring to FIG. 8, in two adjacent single-mode waveguides 110, at least one single-mode waveguide 110 may include a sub-wavelength grating waveguide, and the duty ratios of the two single-mode waveguides 110 are not equal to each other.

The sub-wavelength grating waveguide may include a plurality of waveguide portions 111 arranged with intervals along the first direction x. Each waveguide portion ill and a blank area 112 located therebehind are combined to form a period 113, and a duty ratio of the sub-wavelength grating waveguide may be a percentage of a length of the waveguide portion 111 along the first direction x in a length of the period 113 along the first direction x. The single-mode waveguides 110 with different duty ratios may be manufactured by adjusting the growth process of the waveguides, which is simple in forming mode and low in production cost.

In an exemplary solution, in two adjacent single-mode waveguides 110, one single-mode waveguide 110 may include a sub-wavelength grating waveguide, and the other single-mode waveguide 110 may be a strip waveguide. The duty ratio of the strip waveguide is 100%, the production process of the strip waveguide is more mature, and the manufacturing mode is simpler. Therefore, designing the waveguide assembly 100 to include the strip waveguide can simplify the processing of the waveguide assembly 100 and improve the production efficiency.

In another exemplary solution, in two adjacent single-mode waveguides 110, the two single-mode waveguides 110 may both include a sub-wavelength grating waveguide, and the duty ratios of the two single-mode waveguides 110 are not equal to each other. Designing the two adjacent single-mode waveguides 110 to include the sub-wavelength grating waveguides can make the combination of the two adjacent single-mode waveguides 110 more diverse and broaden the application prospects.

Similarly, when the duty ratios of two adjacent single-mode waveguides 110 are not equal to each other, in a plurality of single-mode waveguides 110 of the waveguide assembly 100, two or more adjacent single-mode waveguides 110 may be combined to form a waveguide unit 120, and the waveguide assembly 100 may include a plurality of waveguide units 120 arranged along the second direction y. Two single-mode waveguides 110, three single-mode waveguides 110, four single-mode waveguides 110, or the like may be included in the waveguide unit 120, which is not limited in the embodiment of the present application.

When three or more single-mode waveguides 110 are included in the waveguide unit 120, the duty ratios of the three or more single-mode waveguides 110 in the waveguide unit 120 along the second direction y may sequentially increase, sequentially decrease, sequentially increase and then decrease, sequentially decrease and then increase, or the like, which is not limited in the embodiment of the present application.

Figure 8:
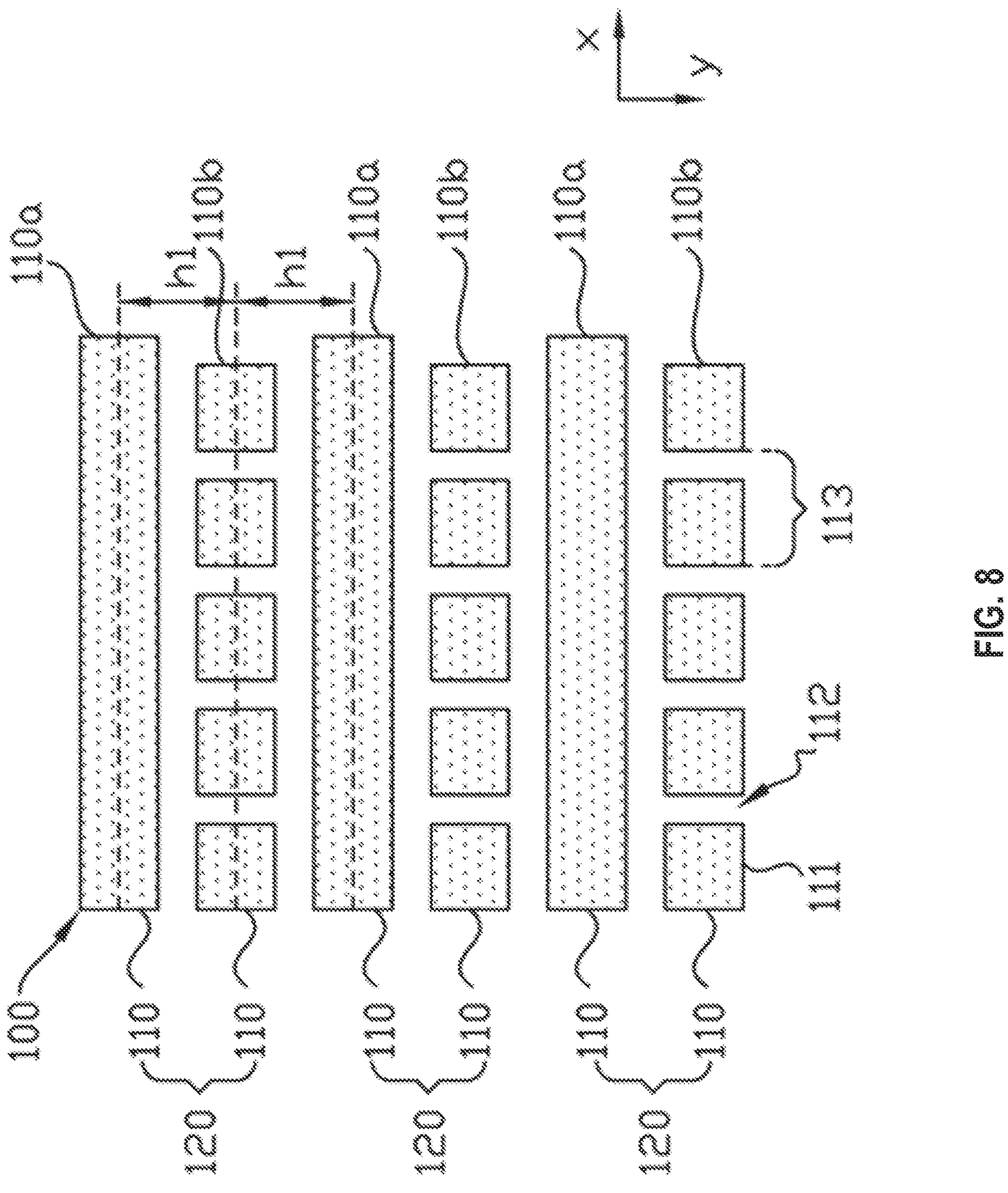
FIG. 8 is a schematic structural diagram of a fifth waveguide assembly provided in an embodiment of the present application.

For example, referring to FIG. 8, the waveguide assembly 100 may include a first single-mode waveguide 110*a*, a second single-mode waveguide 110*b*, a first single-mode waveguide 110*a*, a second single-mode waveguide 110*b*, a first single-mode waveguide 110*a*, a second single-mode waveguide 110*b*, and the like, which are sequentially arranged along the second direction y. At this time, the first single-mode waveguide 110*a* and the adjacent second single-mode waveguide 110*b* located therebehind may be considered as a waveguide unit 120 in combination. In some embodiments, the duty ratio of the first single-mode waveguide 110*a* may be greater than or less than the duty ratio of the second single-mode waveguide 110*b*. The first single-mode waveguide 110*a* may be a strip waveguide, and the second single-mode waveguide 110*b* may be a sub-wavelength grating waveguide. Both the first single-mode waveguide 110*a* and the second single-mode waveguide 110*b* may also be sub-wavelength grating waveguides. Each waveguide unit 120 includes the same two kinds of single-mode waveguides 110, and the arrangement order of the two single-mode waveguides 110 in each waveguide unit 120 is the same.

Figure 9:
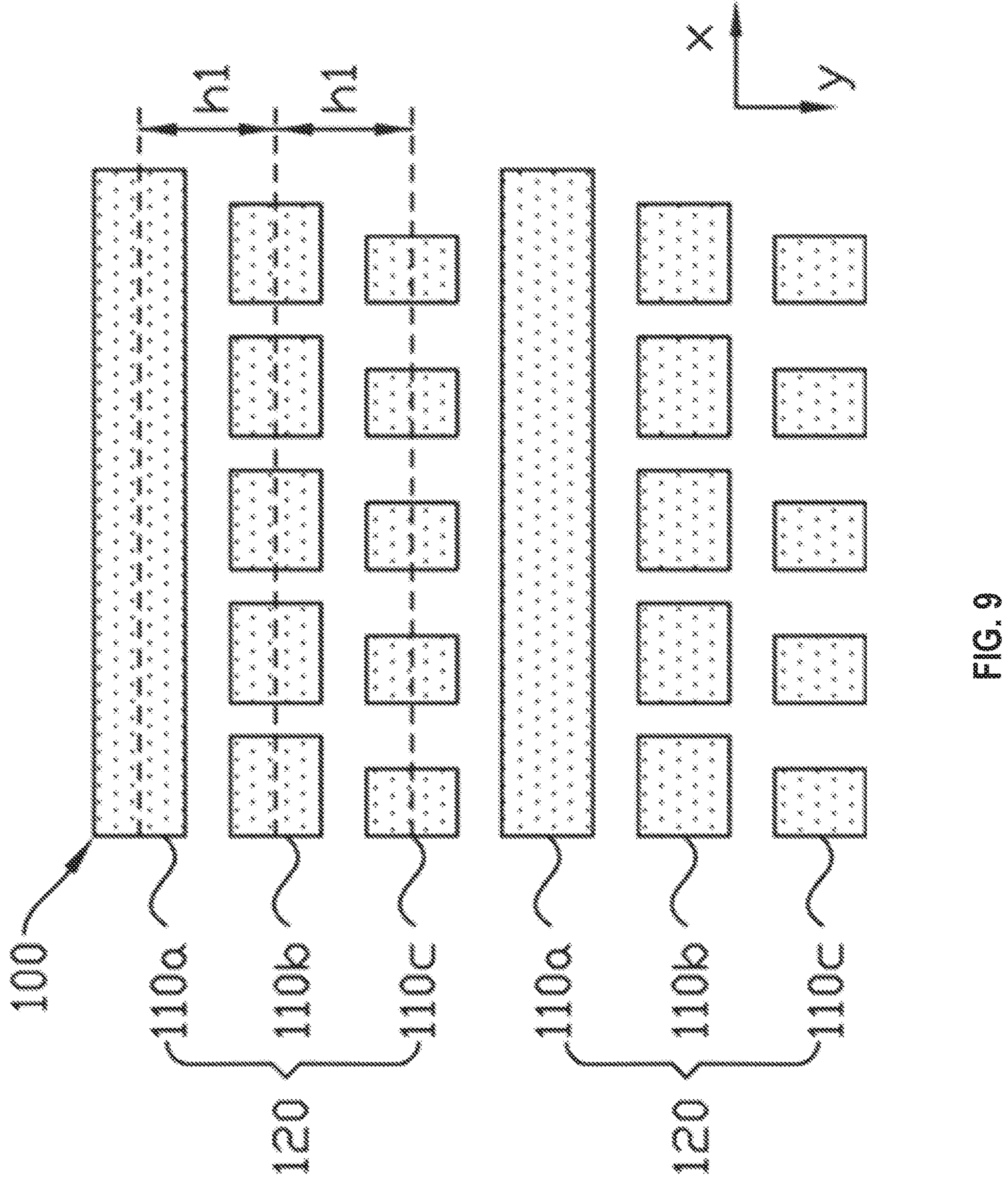
FIG. 9 is a schematic structural diagram of a sixth waveguide assembly provided in an embodiment of the present application.

For another example, referring to FIG. 9, the waveguide assembly 100) may include a first single-mode waveguide 110*a*, a second single-mode waveguide 110*b*, a third single-mode waveguide 110*c*, a first single-mode waveguide 110*a*, a second single-mode waveguide 110*b*, a third single-mode waveguide 110*c*, and the like, which are sequentially arranged along the second direction y. At this time, the first single-mode waveguide 110*a*, the second single-mode waveguide 110*b*, and the third single-mode waveguide 110*c* adjacent thereto and located therebehind may be considered as a waveguide unit 120. In some embodiments, the duty ratio of the first single-mode waveguide 110*a* may be greater than the duty ratio of the second single-mode waveguide 110*b*, and the duty ratio of the second single-mode waveguide 110*b* may be greater than the duty ratio of the third single-mode waveguide 110*c*. In some embodiments, referring to FIG. 10, the duty ratio of the first single-mode waveguide 110*a* may be greater than the duty ratio of the third single-mode waveguide 110*c*, and the duty ratio of the third single-mode waveguide 110*c* may be greater than the duty ratio of the second single-mode waveguide 110*b*. The first single-mode waveguide 10*a* may be a strip waveguide, and both the second single-mode waveguide 110*b* and the third single-mode waveguide 110*c* may be sub-wavelength grating waveguides. All the first single-mode waveguide 110*a*, the second single-mode waveguide 110*b*, and the third single-mode waveguide 110*c* may also be sub-wavelength grating waveguides. Each waveguide unit 120 includes the same three kinds of single-mode waveguides 110, and the arrangement order of the three single-mode waveguides 110 in each waveguide unit 120 is the same.

Figure 11:
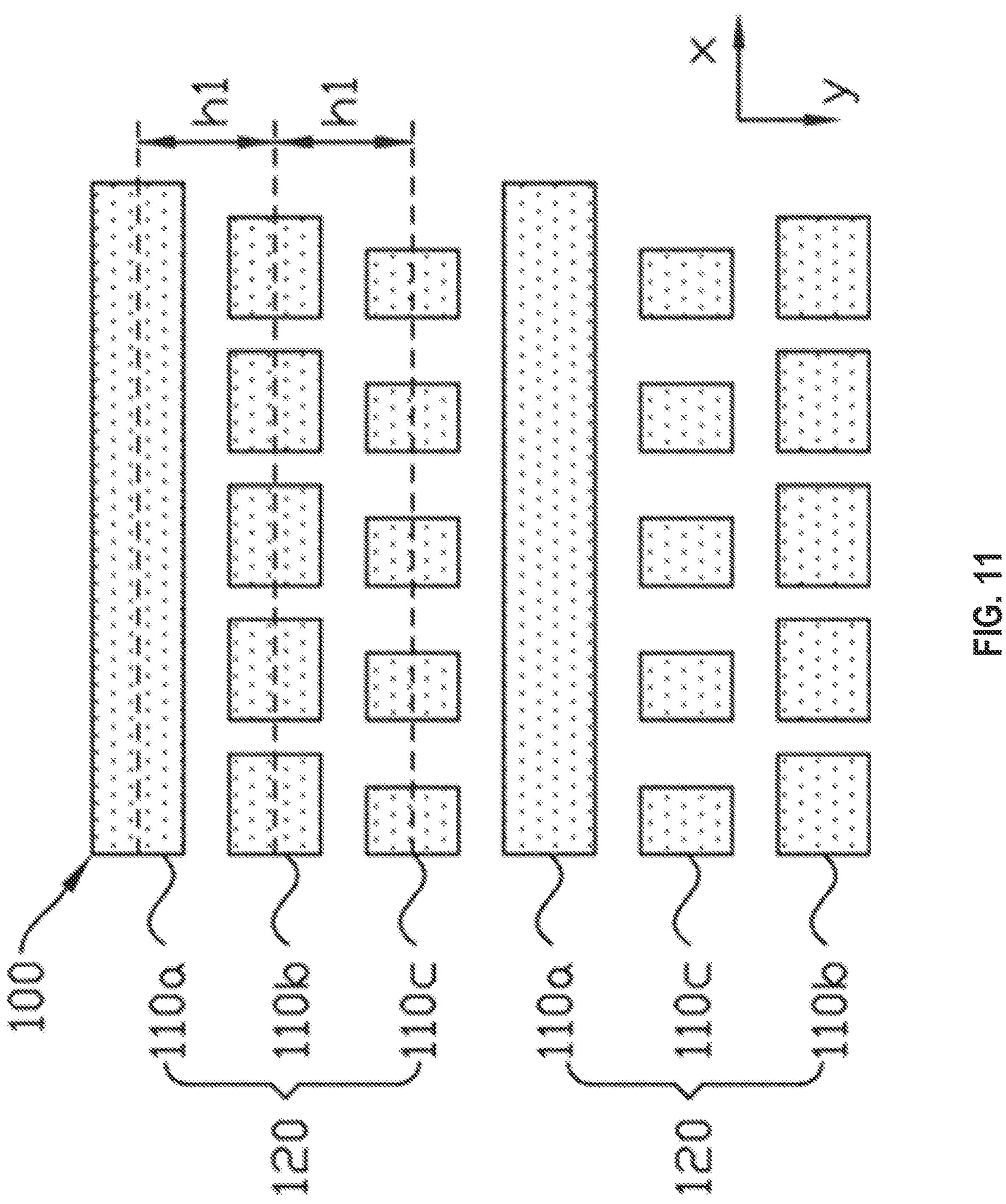
FIG. 11 is a schematic structural diagram of an eighth waveguide assembly provided in an embodiment of the present application.

For yet another example, referring to FIG. 11, the waveguide assembly 100 may include a first single-mode waveguide 110*a*, a second single-mode waveguide 110*b*, a third single-mode waveguide 110*c*, a first single-mode waveguide 110*a*, a third single-mode waveguide 110*c*, a second single-mode waveguide 110*b*, and the like, which are sequentially arranged along the second direction y. At this time, the first single-mode waveguide 110*a*, the second single-mode waveguide 110*b*, and the third single-mode waveguide 110*c* adjacent thereto and located therebehind are considered as a waveguide unit 120. The rear first single-mode waveguide 110*a*, the third single-mode waveguide 110*c*, and the second single-mode waveguide 110*b* adjacent thereto and located therebehind may be considered as another waveguide unit 120. In some embodiments, the duty ratio of the first single-mode waveguide 110*a* may be greater than the duty ratio of the third single-mode waveguide 110*c*, and the duty ratio of the third single-mode waveguide 110*c* may be greater than the duty ratio of the second single-mode waveguide 110*b*. The first single-mode waveguide 110*a* may be a strip waveguide, and both the second single-mode waveguide 110*b* and the third single-mode waveguide 110*c* may be sub-wavelength grating waveguides. All the first single-mode waveguide 110*a*, the second single-mode waveguide 110*b*, and the third single-mode waveguide 110*c* may also be sub-wavelength grating waveguides. Each waveguide unit 120 includes the same three kinds of single-mode waveguides 110, and the arrangement order of the three single-mode waveguides 110 in each waveguide unit 120 is different.

It should be noted that each waveguide unit 120 may include the same of a plurality of single-mode waveguides 110, and the arrangement order of the plurality of single-mode waveguides 110 in each waveguide unit 120 may be the same or different, which is not limited in the embodiment of the present application.

Figure 10:
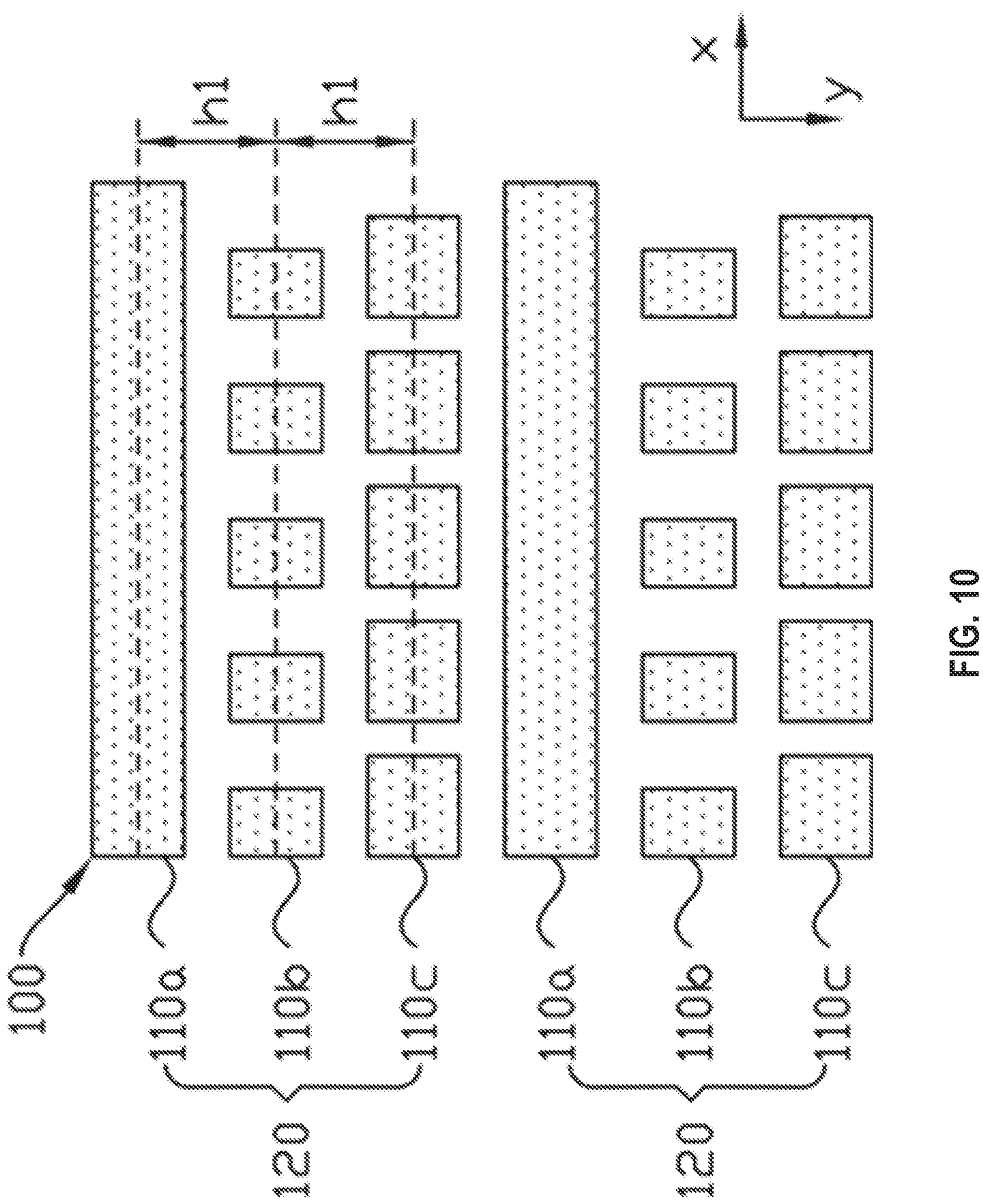
FIG. 10 is a schematic structural diagram of a seventh waveguide assembly provided in an embodiment of the present application.

In some embodiments, referring to FIG. 9 to FIG. 11, when the duty ratios of two adjacent single-mode waveguides 110 are not equal to each other, the lengths of two adjacent single-mode waveguides 110 along the first direction x may be equal to each other, and the center-to-center spacing h1 between each two adjacent single-mode waveguides 110 may be equal, so that the receiving performance of echo laser signals in the waveguide assembly 100 is better. It should be noted that, for the sub-wavelength grating waveguide, the length dimension along the first direction x thereof should be the length dimension along the first direction x of all periods 113 included in the sub-wavelength grating waveguide, and not only the length dimension along the first direction x of the waveguide portion 111 in the sub-wavelength grating waveguide.

In some embodiments, in the waveguide assembly 100, when two or more single-mode waveguides 110 each includes a sub-wavelength grating waveguide, the period 113 of each sub-wavelength grating waveguide may be equal. In this way, it is convenient to realize that the length of each sub-wavelength grating waveguide along the first direction x is equal, and when the lengths are equal, the number of periods 113 included is the same.

Figure 12:
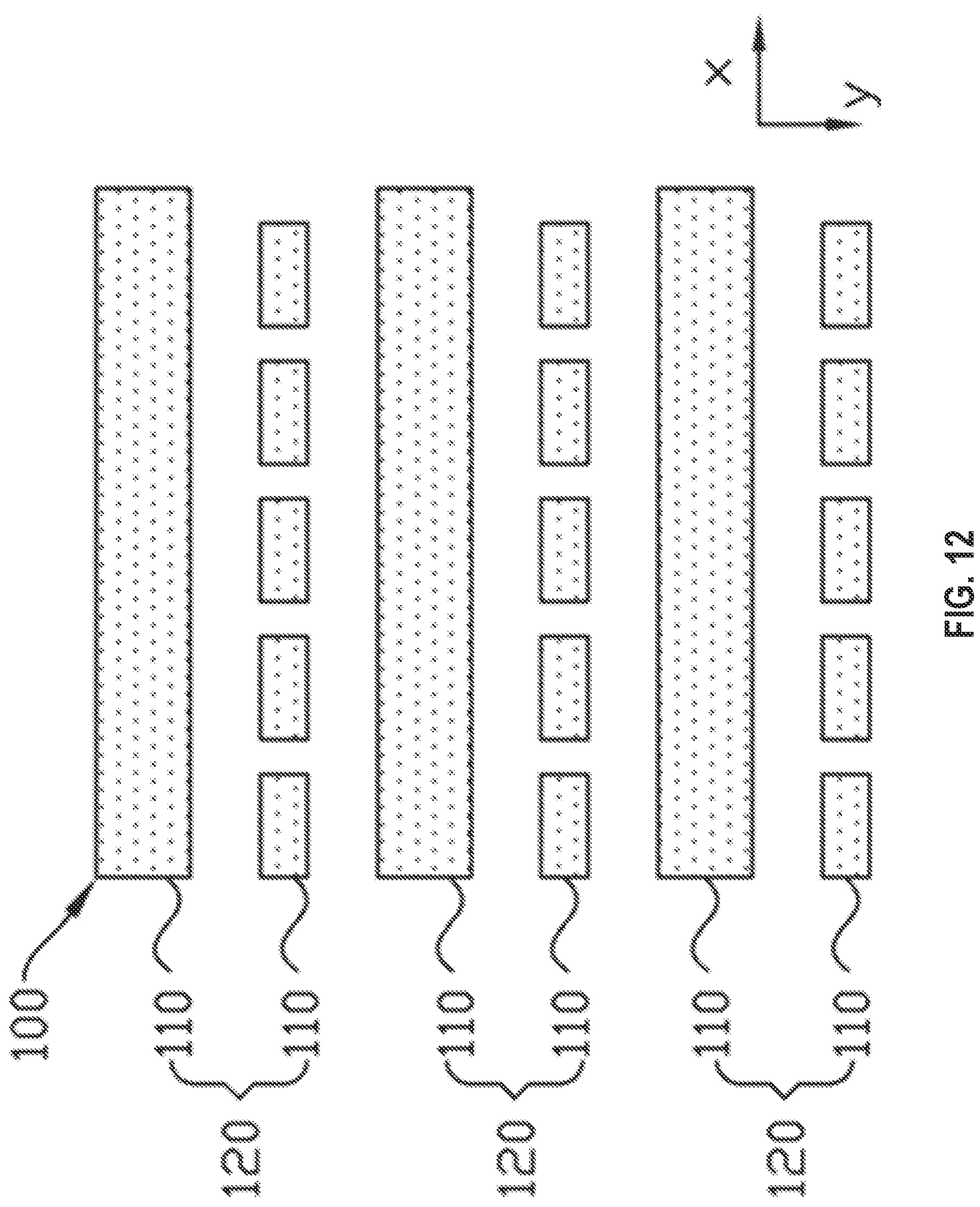
FIG. 12 is a schematic structural diagram of a ninth waveguide assembly provided in an embodiment of the present application.
Figure 13:
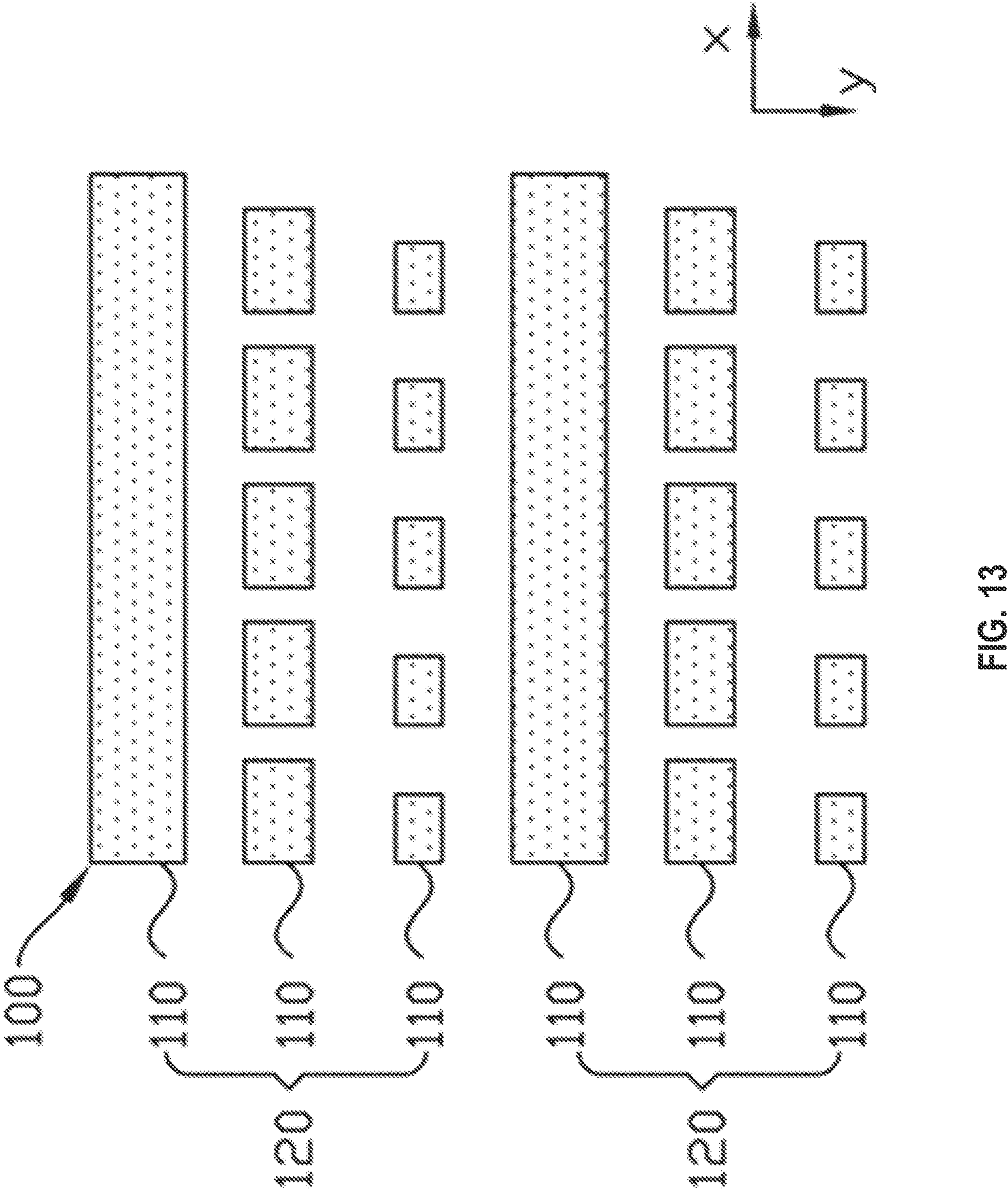
FIG. 13 is a schematic structural diagram of a tenth waveguide assembly provided in an embodiment of the present application.
Figure 14:
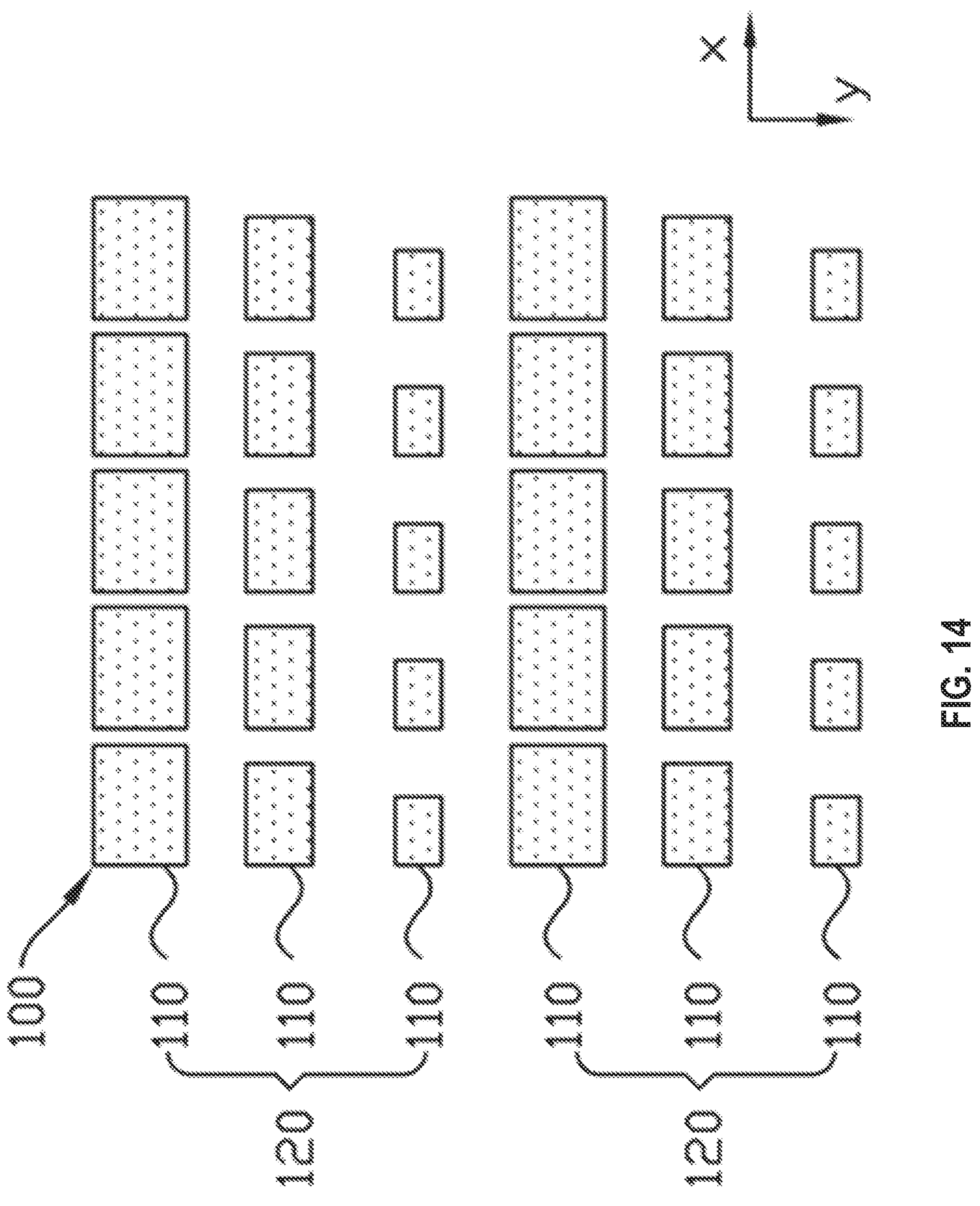
FIG. 14 is a schematic structural diagram of an eleventh waveguide assembly provided in an embodiment of the present application.

It should be noted that, in order to realize that the effective refractive indexes of two adjacent single-mode waveguides 110 are not equal, referring to FIG. 12 to FIG. 14, two adjacent single-mode waveguides 110 may have different widths along the second direction y, and may also have different duty ratios. That is, in two adjacent single-mode waveguides 110, the width of one single-mode waveguide 110 along the second direction y is not equal to the width of the other single-mode waveguide 110 along the second direction y, and at least one single-mode waveguide 110 includes a sub-wavelength grating waveguide; the duty ratios of the two single-mode waveguides 110 are not equal to each other, such that the structural design of the waveguide assembly 100 is more diversified, which can meet different use requirements.

Figure 15:
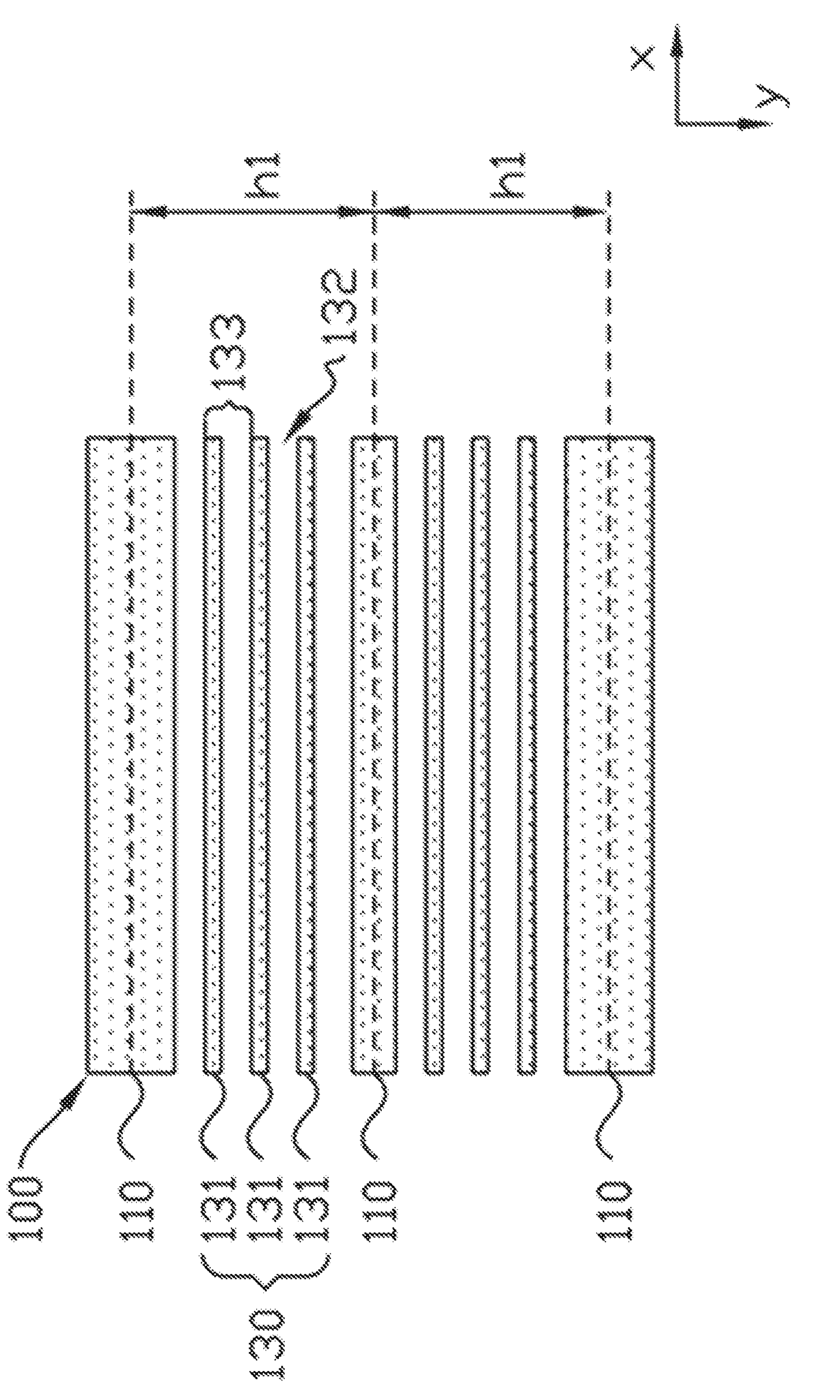
FIG. 15 is a schematic structural diagram of a twelfth waveguide assembly provided in an embodiment of the present application.

In some embodiments, referring to FIG. 15, in a plurality of single-mode waveguides 110, an isolation structure 130 may be arranged between at least one single-mode waveguide 110 and another adjacent single-mode waveguide 110. The design of the isolation structure 130 may weaken the coupling performance between two adjacent single-mode waveguides 110, and reduce the crosstalk between the two single-mode waveguides. Therefore, under the same requirement for coupling capability, the spacing between two single-mode waveguides 110 provided with the isolation structure 130 may be designed to be smaller, and the offset echo laser signals are less likely to fall onto a blank area between two adjacent single-mode waveguides 110, so that the receiving rate of the echo laser signals can be improved.

In some embodiments, the isolation structure 130 may include a plurality of layers of isolation bars 131 arranged with intervals along the second direction y, wherein each layer of isolation bar 131 may extend along the first direction x. By adding a periodic sub-wavelength multi-layer structure between two adjacent single-mode waveguides 110, mutual coupling of laser signals in a specific wavelength range in the two adjacent single-mode waveguides 110 can be blocked, and the crosstalk of the laser signals in the specific wavelength range between the two adjacent single-mode waveguides 110 can be reduced.

The specific wavelength range is related to the period 133 and the duty ratio of the isolation bar 131. By changing the period 133 and the duty ratio of the isolation bar 131, laser signals of different wavelength ranges can be blocked. The isolation bar 131 may be considered as a structure having a smaller width along the second direction y than the width of the single-mode waveguide 110 along the second direction y. Each isolation bar 131 and a blank area 132 located therebehind along the second direction y may be combined to form a period 133. The duty ratio of the isolation bar 131 may be a percentage of the width of the isolation bar 131 along the second direction y in the width of the period 133 along the second direction y. In some embodiments, the number of layers of the isolation bars 131 arranged with intervals along the second direction y and included in the isolation structure 130 may be two, three, four, five, or the like, which is not limited in the embodiment of the present application. The number of layers of isolation bars 131 included in the isolation structure 130 between two adjacent single-mode waveguides 110 may be equal or not, and the types of the isolation bars 131 included in the isolation structure 130 between two adjacent single-mode waveguides 110 may be the same or different, which are not limited in the embodiment of the present application. The different types of the isolation bars 131 may be different widths of the isolation bars 131 along the second direction y, and the like, which is not limited in the embodiment of the present application.

Figure 16:
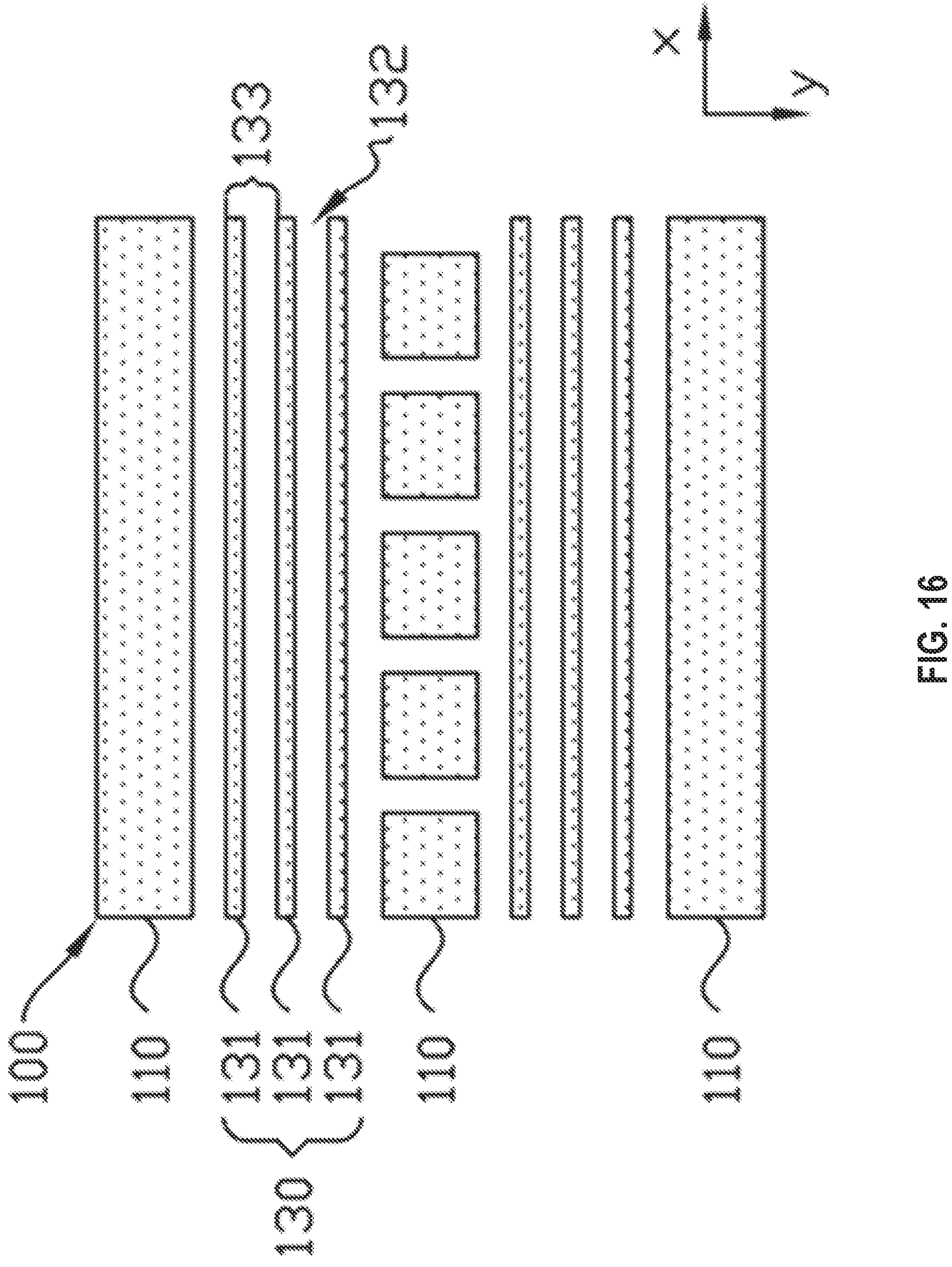
FIG. 16 is a schematic structural diagram of a thirteenth waveguide assembly provided in an embodiment of the present application.
Figure 17:
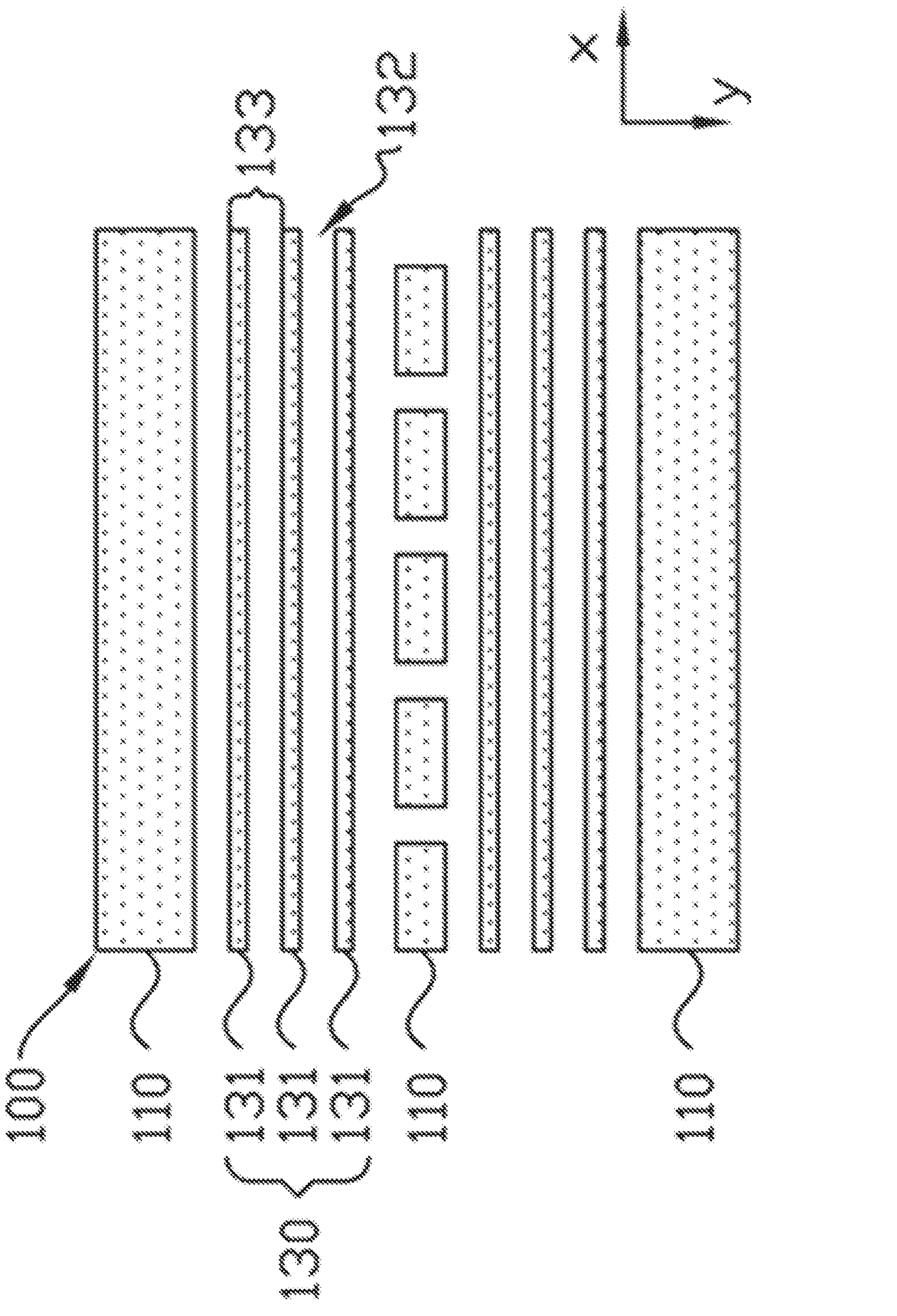
FIG. 17 is a schematic structural diagram of a fourteenth waveguide assembly provided in an embodiment of the present application.

In some embodiments, in two adjacent single-mode waveguides 110, the effective refractive indexes of one single-mode waveguide 110 and the other single-mode waveguide 110 may be not equal to each other, and an isolation structure 130 may be arranged between the two single-mode waveguides. For example, as shown in FIG. 15, in two adjacent single-mode waveguides 110, the width of one single-mode waveguide 110 along the second direction y is not equal to the width of the other single-mode waveguide 110 along the second direction y, and an isolation structure 130 is arranged between the two single-mode waveguides. Referring to FIG. 16, in two adjacent single-mode waveguides 110, the duty ratio of one single-mode waveguide 110 is not equal to the duty ratio of the other single-mode waveguide 110, and an isolation structure 130 is arranged between the two single-mode waveguides. Referring to FIG. 17, in two adjacent single-mode waveguides 110, the width of one single-mode waveguide 110 along the second direction y is not equal to the width of the other single-mode waveguide 110 along the second direction y, the duty ratio of one single-mode waveguide 110 is not equal to the duty ratio of the other single-mode waveguide 110, and an isolation structure 130 is arranged between the two single-mode waveguides.

Figure 18:
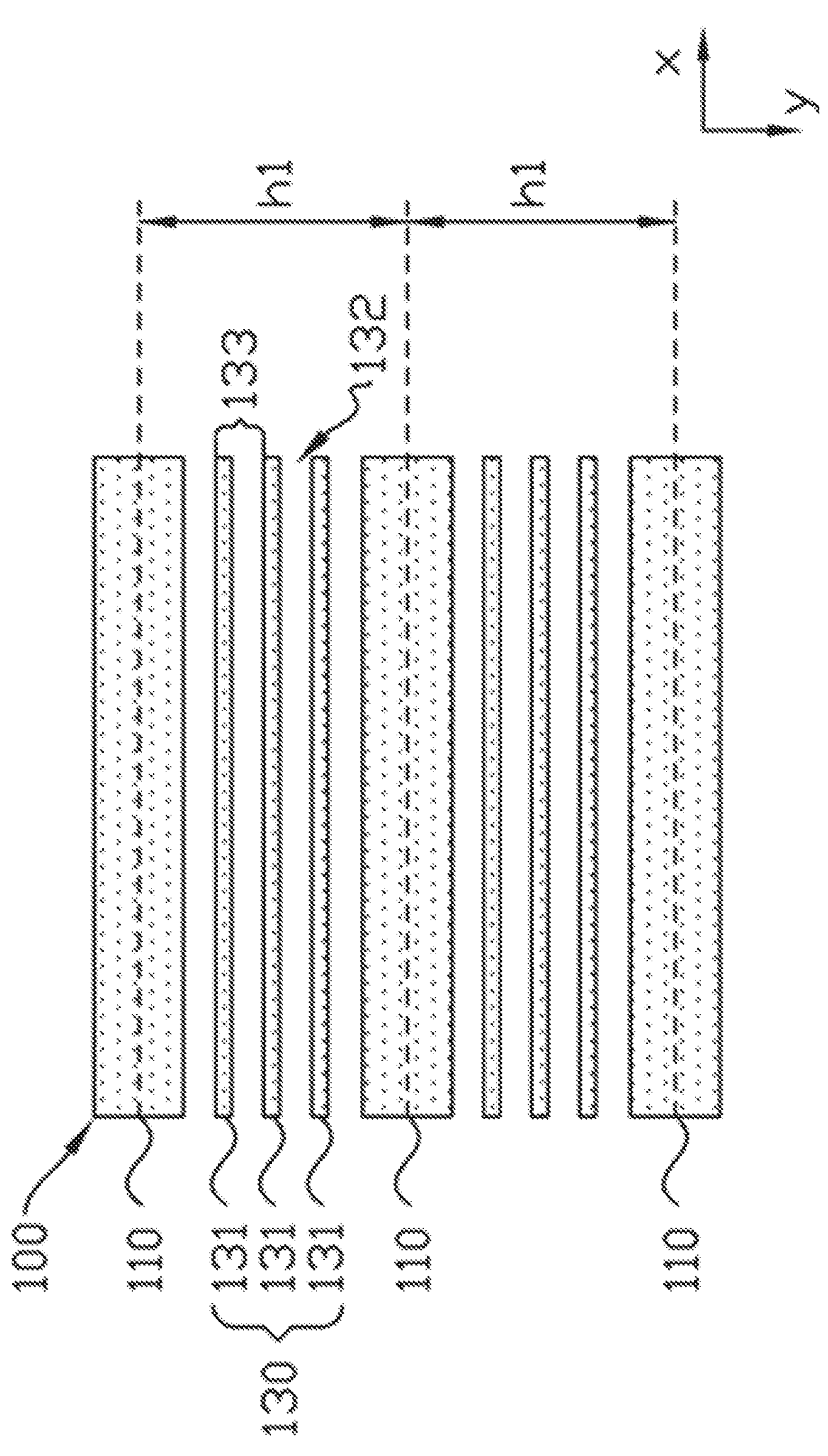
FIG. 18 is a schematic structural diagram of a fifteenth waveguide assembly provided in an embodiment of the present application.

Referring to FIG. 18, the embodiment of the present application provides another waveguide assembly 100 for receiving an echo laser signal in the LiDAR 1. The waveguide assembly 100 shown in FIG. 18 is substantially the same as the waveguide assembly 100 shown in FIG. 15, except the following aspects. FIG. 15 shows a waveguide assembly 100 in which the width of one single-mode waveguide 110 along the second direction y is not equal to the width of another adjacent single-mode waveguide 110 along the second direction y; while FIG. 18 shows a waveguide assembly 100 in which the width of one single-mode waveguide 110 along the second direction y is equal to the width of another adjacent single-mode waveguide 110 along the second direction y. The coupling between two adjacent single-mode waveguides 110 may be weakened only by arranging the isolation structure 130 between the two adjacent single-mode waveguides 110, thus reducing the crosstalk between the two adjacent single-mode waveguides. In this way, under the same coupling capability requirement, the spacing between two single-mode waveguides 110 provided with the isolation structure 130 may be designed to be smaller, thus the offset echo laser signals are less likely to fall onto a blank area between two adjacent single-mode waveguides 110, thereby improving the receiving rate of the echo laser signals.

In some embodiments, referring to FIG. 15 to FIG. 18, when the isolation structure 130 is arranged between two adjacent single-mode waveguides 110, the lengths of two adjacent single-mode waveguides 110 along the first direction x may be equal to each other, and the center-to-center spacing h1 between each two adjacent single-mode waveguides 110 may be equal, so that the receiving performance of echo laser signals in the waveguide assembly 100 is better.

Figure 19:
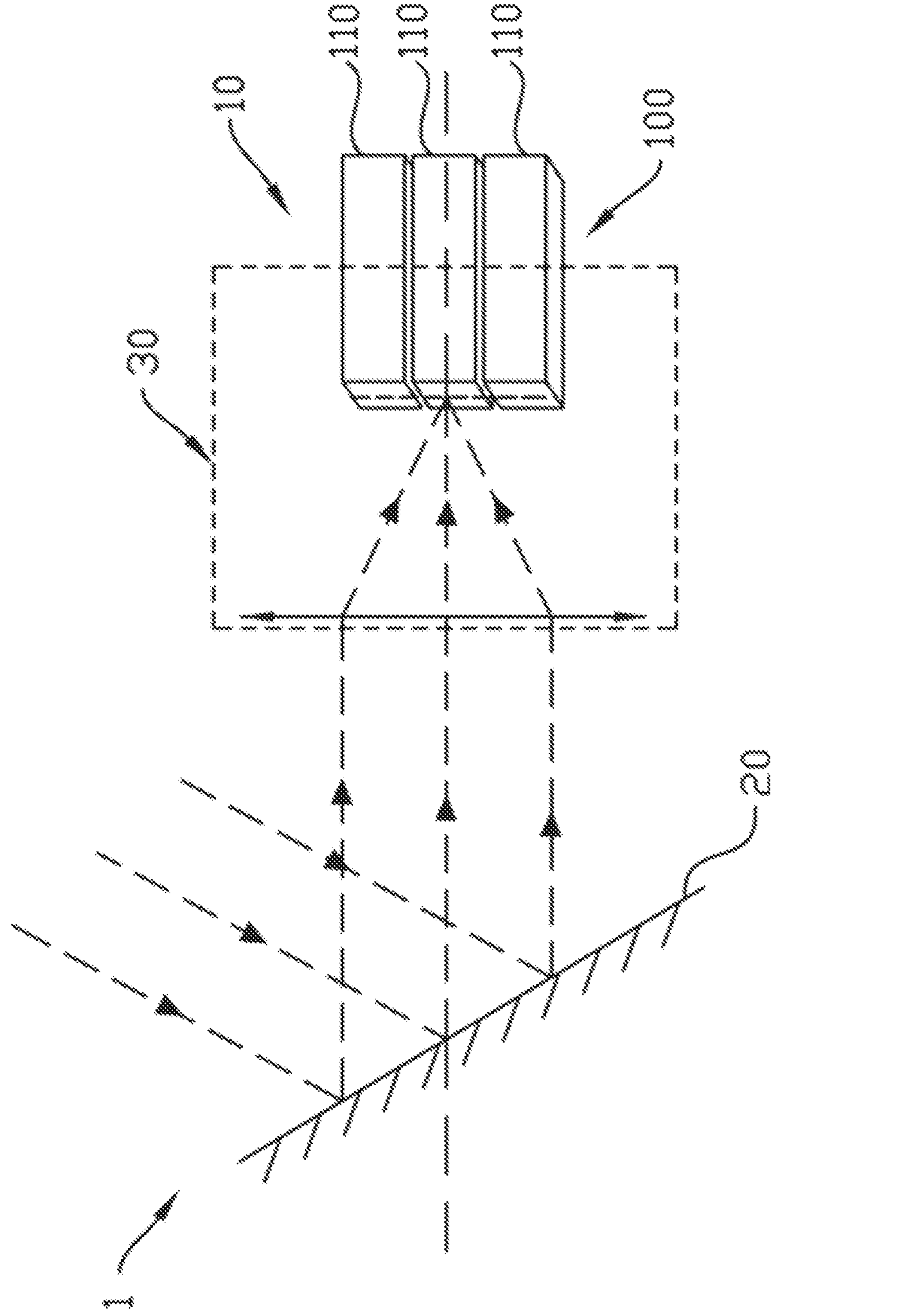
FIG. 19 is a schematic diagram of an optical path of an echo laser signal of a LiDAR in a state provided in an embodiment of the present application.
Figure 20:
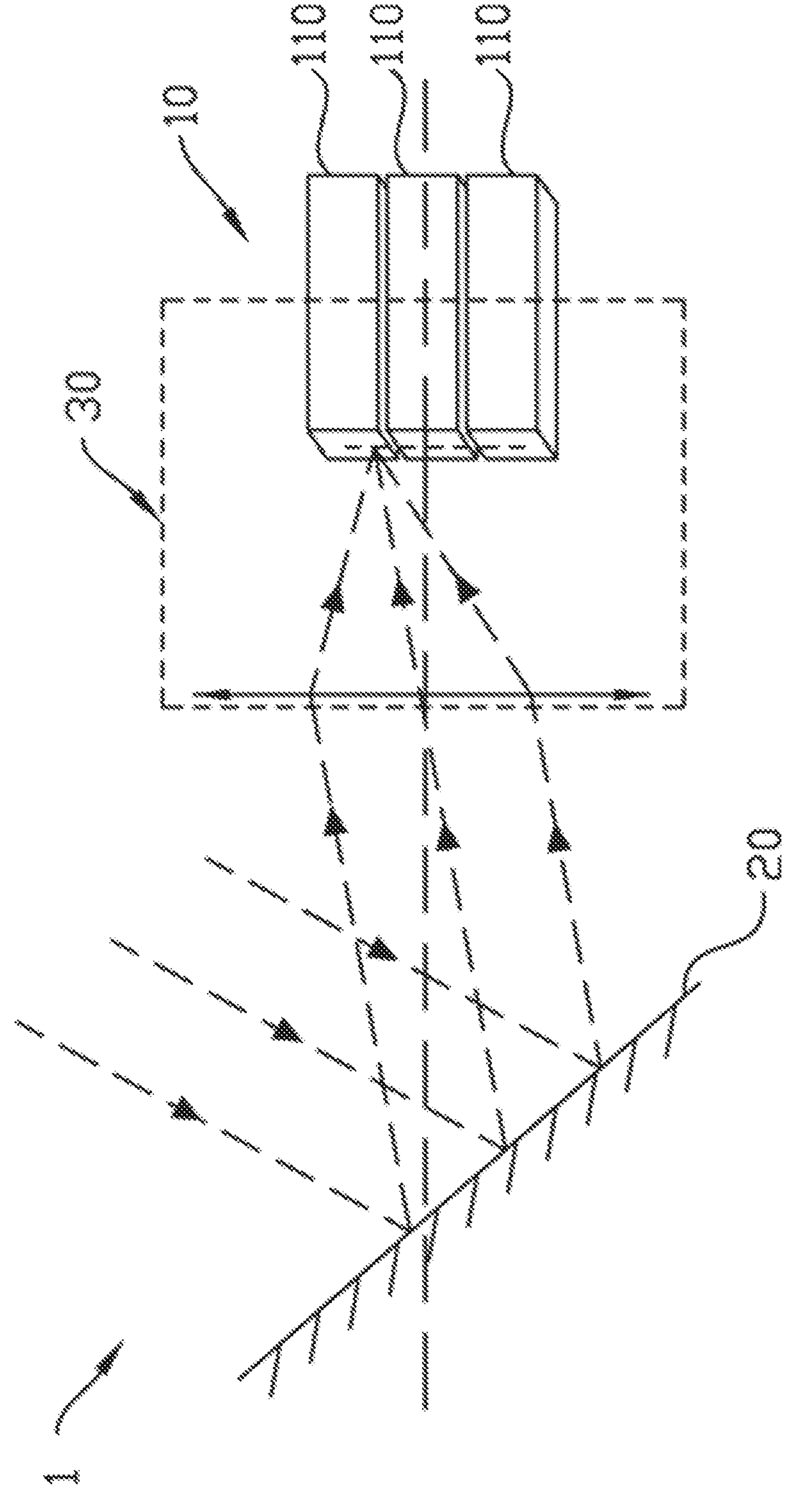
FIG. 20 is a schematic diagram of an optical path of an echo laser signal of the LiDAR shown in FIG. 19 in another state.
Figure 21:
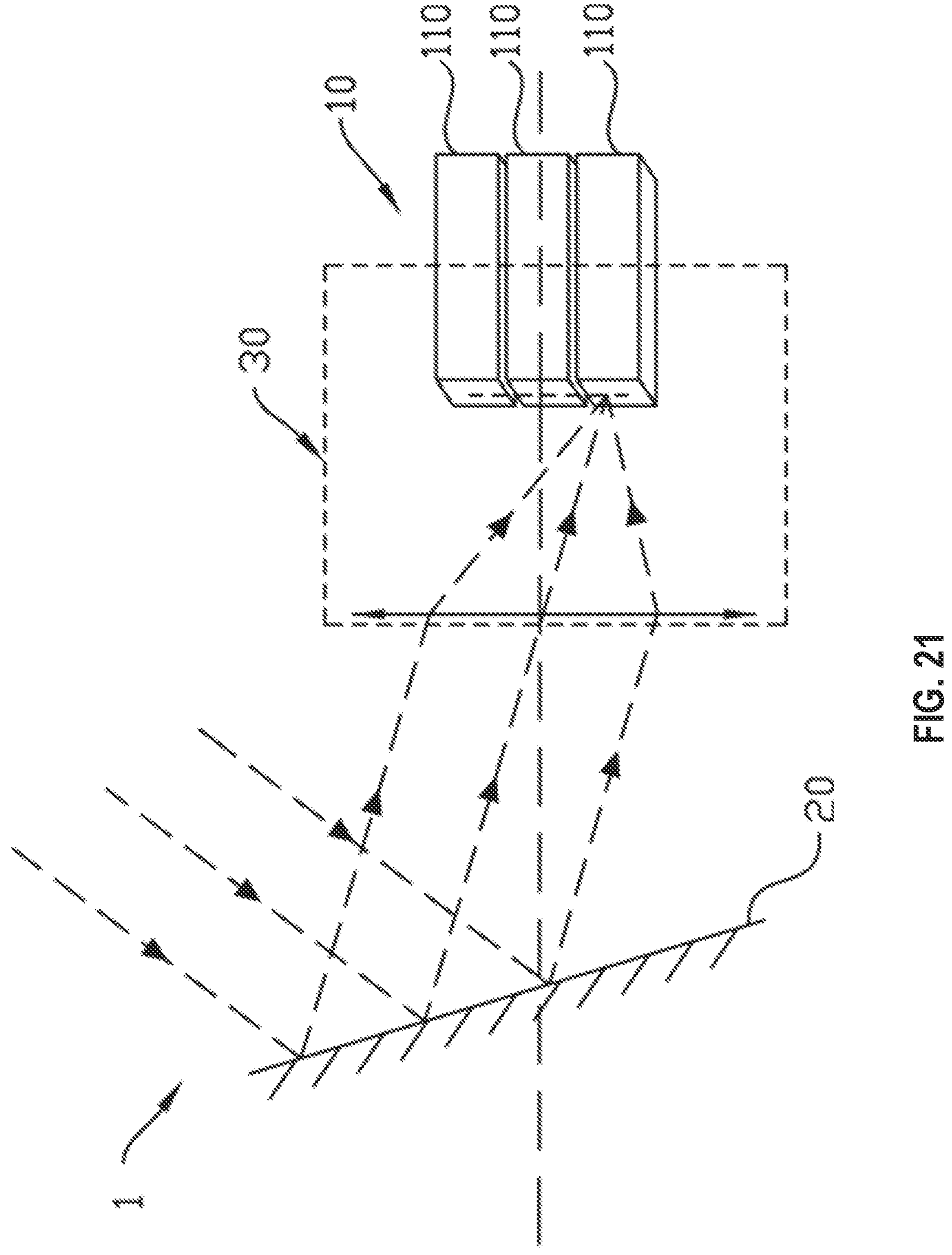
FIG. 21 is a schematic diagram of an optical path of an echo laser signal of the LiDAR shown in FIG. 19 in yet another state.

In a second aspect, an embodiment of the present application provides an integrated chip 10. Referring to FIG. 19 to FIG. 21, the integrated chip 10 may include a substrate and a waveguide assembly 100 arranged on the substrate, and has the advantages of higher receiving rate of echo laser signals, smaller chip size, and the like.

In a third aspect, an embodiment of the present application provides a LiDAR 1. The LiDAR 1 may include the integrated chip 10 described above, and the waveguide assembly 100 of the integrated chip 10 is configured for emitting a laser signal to a detected target; and/or, the waveguide assembly 100 of the integrated chip 10 is configured for receiving the echo laser signal reflected by the detected target, and has the advantages of higher receiving rate of echo laser signals, miniaturized structure, and the like.

In some embodiments, the LiDAR 1 may further include an optical scanning device 20. The optical scanning device 20 is configured for changing a direction of the echo laser signal and enabling the echo laser signal to be emitted to the waveguide assembly 100. For example, the optical scanning device 20 may scan along a vertical direction and/or a horizontal direction. The optical scanning device 20 may be any device that can change a light propagation path, such as a MEMS galvanometer, a reflector, a projection prism, a rotating mirror, or the like, which is not limited in the embodiment of the present application.

In some embodiments, the LiDAR 1 may further include an optical collimator 30. Taking the optical scanning device 20 as a MEMS galvanometer as an example, in the coaxial transceiver system, the MEMS galvanometer is responsible for transmitting and receiving light. The laser signal emitted from the single-mode waveguide 110 on the integrated chip 10 may be converted into parallel light after passing through the optical collimator 30, and the echo light received by the MEMS galvanometer is also parallel light. When the MEMS galvanometer is stationary, the optical path of the emitted laser signal is reversible with the optical path of the received echo laser signal, and the echo laser signal can be focused into the single-mode waveguide 110 on the integrated chip 10 behind the optical collimator 30. When the MEMS galvanometer rotates, the MEMS galvanometer will rotate by a certain angle $\Delta\theta$ in a process that the MEMS galvanometer emits a laser signal to a detected target and then receives an echo laser signal reflected by the detected target. In this way, the echo laser signal emitted by the MEMS galvanometer will be deflected by $2\Delta\theta$ compared with the laser signal reaching the MEMS galvanometer, such that the echo laser signal emitted by the MEMS galvanometer cannot return to the corresponding single-mode waveguide 110 in the original path. Due to the inequality of the effective refractive indexes of two adjacent single-mode waveguides 110 designed in the embodiment of the present application, the spacing between two adjacent single-mode waveguides 110 is designed to be closer, so that more offset echo laser signals can be transmitted to other single-mode waveguides 110, thus improving the receiving rate of echo laser signals.

The above disclosure is only for the purpose of illustrating the embodiments of the present application and should not be taken as limiting the scope of the claims of the present application. Equivalent changes made to the claims of the present application still fall within the scope of the present application.

What is claimed is:

1. An integrated chip, comprising a substrate and a waveguide assembly arranged on the substrate, wherein the waveguide assembly is configured for receiving an echo laser signal in a LiDAR, and the waveguide assembly comprises:

a plurality of single-mode waveguides, wherein each single-mode waveguide extends along a first direction, the plurality of single-mode waveguides are arranged with intervals along a second direction, the second direction intersects with the first direction, and an effective refractive index of at least one single-mode waveguide is not equal to an effective refractive index of another adjacent single-mode waveguide, wherein in two adjacent single-mode waveguides, at least one single-mode waveguide comprises a sub-wavelength grating waveguide, and duty ratios of the two adjacent single-mode waveguides are not equal to each other.

2. The integrated chip according to claim 1, wherein an effective refractive index of each single-mode waveguide is not equal to an effective refractive index of another adjacent single-mode waveguide.

3. The integrated chip according to claim 1, wherein in two adjacent single-mode waveguides, a width of one single-mode waveguide along the second direction is not equal to a width of the other single-mode waveguide along the second direction.

4. The integrated chip according to claim 1, wherein in two adjacent single-mode waveguides, one single-mode waveguide comprises a sub-wavelength grating waveguide, and the other single-mode waveguide is a strip waveguide; or in two adjacent single-mode waveguides, the two adjacent single-mode waveguides both comprise sub-wavelength grating waveguides.

5. The integrated chip according to claim 1, wherein two or more adjacent single-mode waveguides are combined to form a waveguide unit, and the waveguide assembly comprises a plurality of the waveguide units arranged along the second direction.

6. The integrated chip according to claim 1, wherein in the plurality of single-mode waveguides, each space from a center of one single-mode waveguide to a center of another adjacent single-mode waveguide is equal.

7. The integrated chip according to claim 1, wherein in the plurality of single-mode waveguides, an isolation structure is arranged between at least one single-mode waveguide and another adjacent single-mode waveguide.

8. The integrated chip according to claim 7, wherein the isolation structure comprises a plurality of isolation bars arranged with intervals along the second direction, each layer of the isolation bars extending along the first direction.

9. A LiDAR, comprising:

an optical scanning assembly, configured for changing a direction of an echo laser signal and transferring the echo laser signal towards a waveguide assembly; and the integrated chip according to claim 1.

* * * * *